(12) United States Patent
Sakai et al.

(10) Patent No.: US 7,705,997 B2
(45) Date of Patent: Apr. 27, 2010

(54) METHOD OF MEASURING TOPOLOGY OF FUNCTIONAL LIQUID DROPLET IN PIXEL, TOPOLOGY MEASURING APPARATUS OF FUNCTIONAL LIQUID IN PIXEL, LIQUID EJECTION APPARATUS, METHOD OF MANUFACTURING ELECTRO-OPTICAL APPARATUS, ELECTRO-OPTICAL APPARATUS, AND ELECTRONIC APPARATUS

(75) Inventors: Hirofumi Sakai, Tsu (JP); Makoto Anan, Chino (JP)

(73) Assignee: Seiko Epson Corporation (JP)

( * ) Notice: Subject to any disclaimer, the term of this patent is extended or adjusted under 35 U.S.C. 154(b) by 283 days.

(21) Appl. No.: 12/006,990

(22) Filed: Jan. 8, 2008

(65) Prior Publication Data
US 2008/0180686 A1   Jul. 31, 2008

(30) Foreign Application Priority Data
Jan. 26, 2007   (JP) .............................. 2007-017166

(51) Int. Cl.
*G01B 11/02* (2006.01)
(52) U.S. Cl. ..................................... 356/511
(58) Field of Classification Search ............. 356/485, 356/489, 492, 495, 496, 503, 511
See application file for complete search history.

(56) References Cited

U.S. PATENT DOCUMENTS

2008/0204502 A1\* 8/2008 Sakai ......................... 347/19
2009/0191326 A1\* 7/2009 Ishizuka et al. ................. 427/9

FOREIGN PATENT DOCUMENTS

JP      2000-121323      4/2000

\* cited by examiner

*Primary Examiner*—Tarifur Chowdhury
*Assistant Examiner*—Jonathan M Hansen
(74) *Attorney, Agent, or Firm*—Harness, Dickey & Pierce, P.L.C.

(57) ABSTRACT

A method of measuring topology of functional liquid in a pixel, in which thickness or volume of the functional liquid in the pixel is measured by a surface topology measuring apparatus comprising: measuring surface topologies in which surface topology of the functional liquid in the pixel and surface topology of the bank are measured by the surface topology measuring apparatus, and measurement parameters regarding the surface topologies are generated; adding a bank height in which a height parameter of a height of the bank is added to the measurement parameter of a surface of the functional liquid in the pixel of the measurement parameter generated; and calculating topology in which the thickness or the volume of the functional liquid in the pixel is calculated based on the added measurement parameter of the surface of the functional liquid in the pixel and the measurement parameter of the surface of the bank.

11 Claims, 23 Drawing Sheets

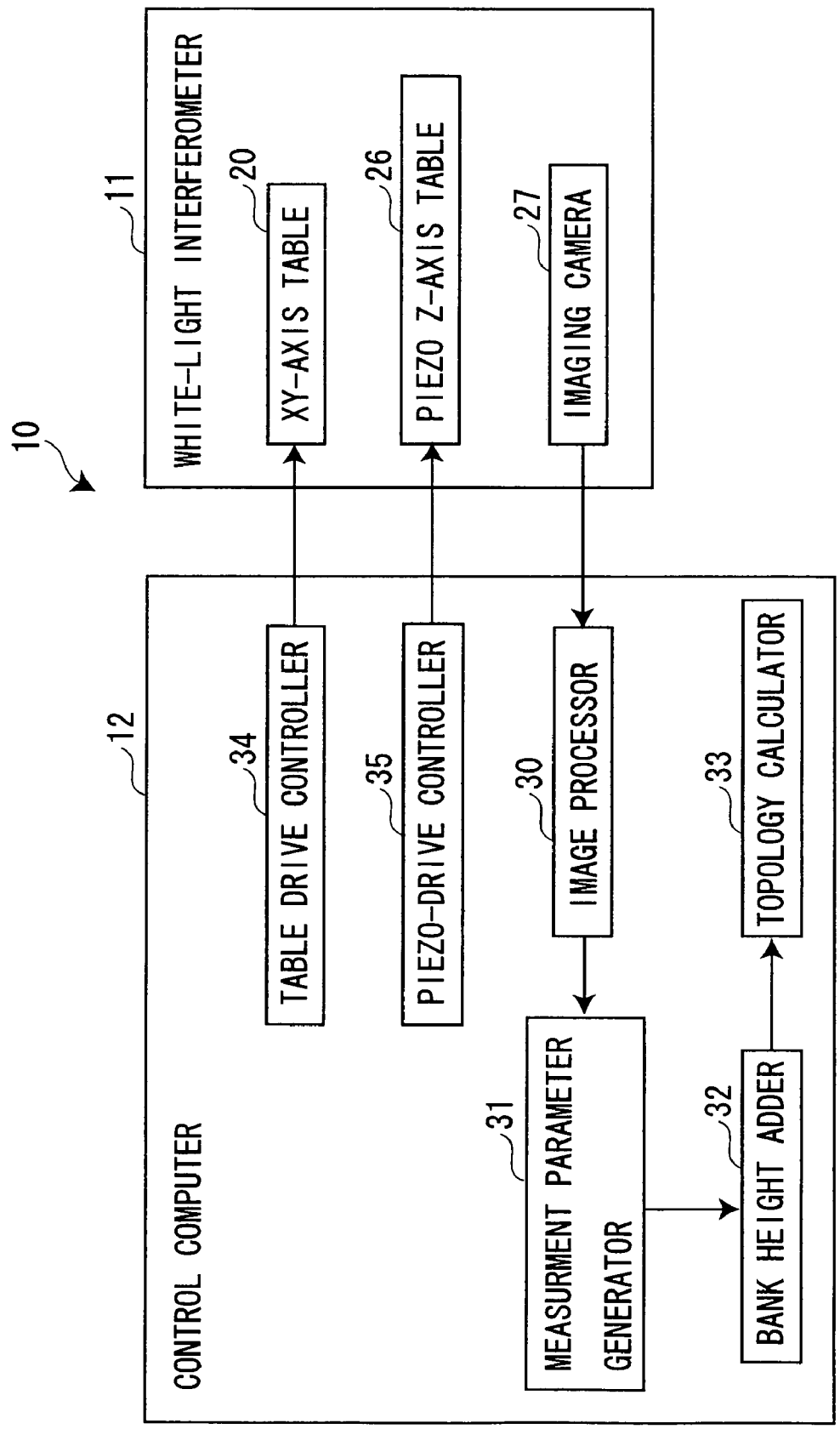

Fig. 4A
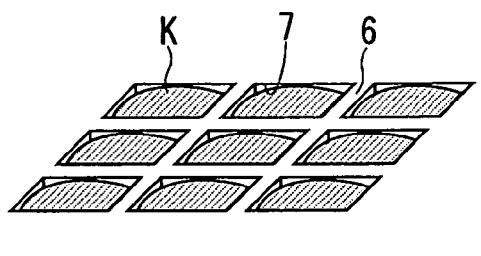 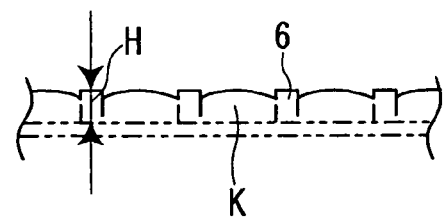
Fig. 4B
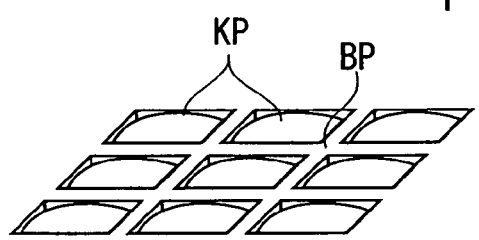 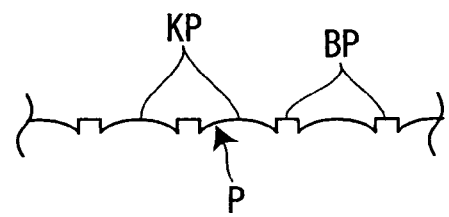
Fig. 4C
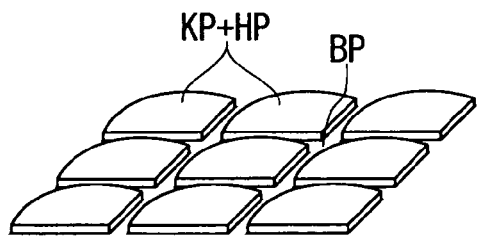 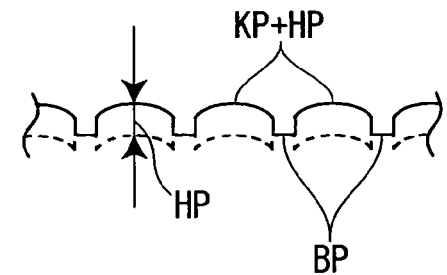
Fig. 4D
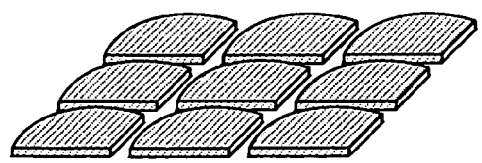 

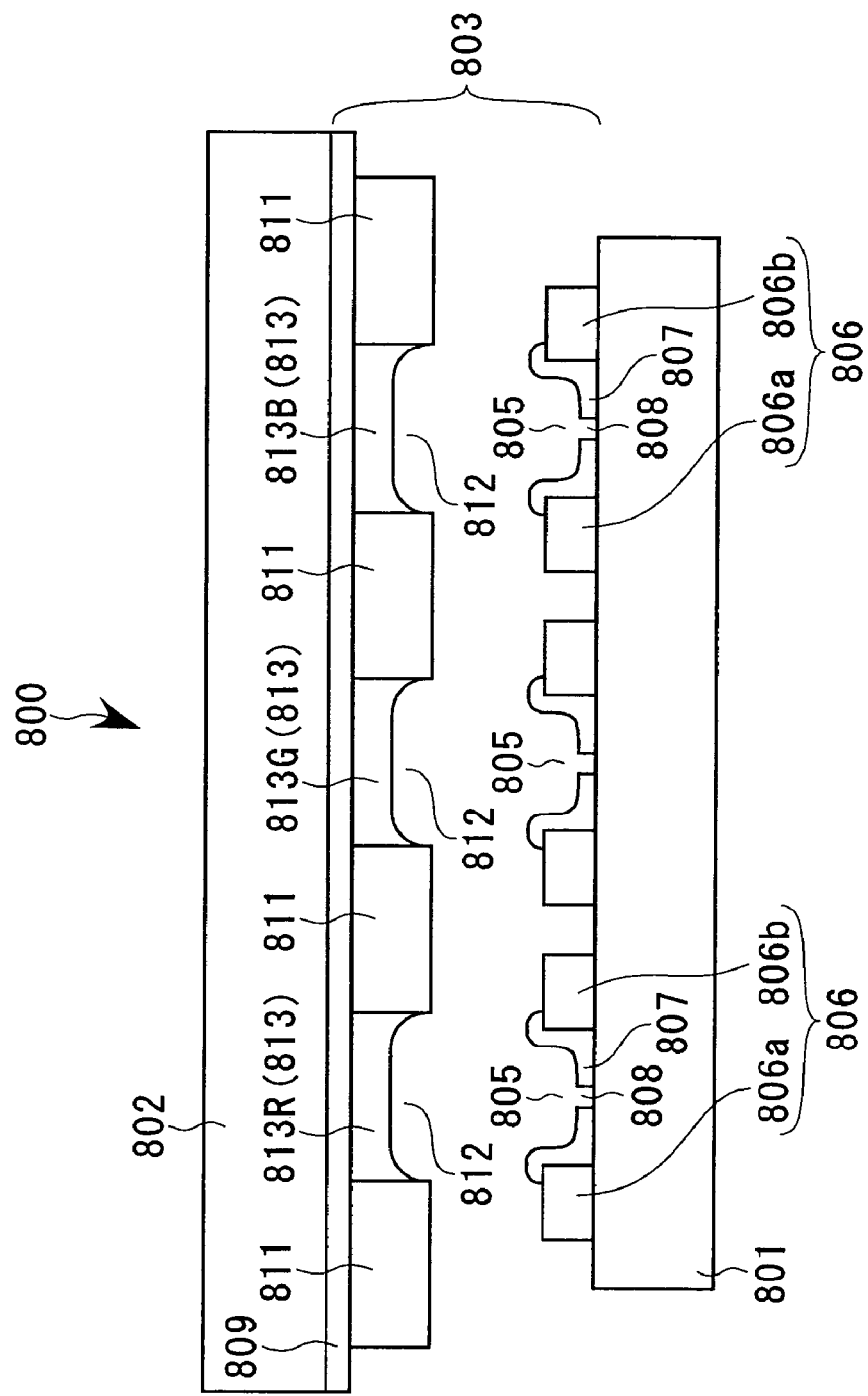

METHOD OF MEASURING TOPOLOGY OF FUNCTIONAL LIQUID DROPLET IN PIXEL, TOPOLOGY MEASURING APPARATUS OF FUNCTIONAL LIQUID IN PIXEL, LIQUID EJECTION APPARATUS, METHOD OF MANUFACTURING ELECTRO-OPTICAL APPARATUS, ELECTRO-OPTICAL APPARATUS, AND ELECTRONIC APPARATUS

The entire disclosure of Japanese Patent Application No. 2007-017166, filed Jan. 26, 2007, is expressly incorporated by reference herein.

BACKGROUND

1. Technical Field

The present invention relates to a method of measuring topology of functional liquid in a pixel, a topology measuring apparatus of functional liquid in a pixel, a liquid droplet ejection apparatus, a method of manufacturing electro-optical apparatus, an electro-optical apparatus, and an electronic apparatus, in which functional liquid droplet is ejected from a functional liquid droplet ejection head on a substrate having banks defining pixel regions to cause functional liquid droplet to arrive in the pixel regions, and at least one of thickness and volume thereof is measured by a surface topology measuring apparatus having an interferometer.

2. Related Art

A topology measuring apparatus as already known works in which interference luminous flux emitted from an interference light source is divided into two, one of which is irradiated on a surface of a measured object at an incident angle more than 82 degrees and in a slit form, and a reflected luminous flux reflects to a detecting array sensor. The other interference luminous flux goes into the detecting array sensor as a slit-like reference luminous flux to interfere with the reflected luminous flux at a light receiving surface, and a height (film thickness) of the measured object, for example, R, G or B filter material of a color filter is detected from an interference phase signal. JP-A-2000-121323 is an example of related art.

In the topology measuring apparatus such as described above, it is possible to measure the height of the three dimensional shaped measured object (the filter material) accurately, but in a case of measuring the film thickness (or the volume) thereof, a reverse surface (a bottom surface of a pixel) facing with the surface needs to be measured accurately. In other words, the height of the bottom surface of the pixel is not uniform, even if a substrate is formed accurately, due to a flatness of a stage on which the substrate is mounted or an influence of a suction condition. Therefore, when the film thickness is calculated based on the height of the bottom surface of the pixel on the design base, the calculation accuracy degrades, causing color heterogeneity.

On the other hand, it is preferable that the height of the bottom On the other hand, it is preferable that the height of the bottom surface of a pixel region is measured with a measuring light which transmits through the filter material. In the known apparatus which measures the height with the measuring light at an incident angle more that 82 degrees, it is not possible to measure due to a bank defining the pixel regions. It is possible to measure with a smaller incident angle, but in this case, an adequate reflecting light can not be obtained due to an irregular reflection by the filter material, leading to poor detection.

SUMMARY

An advantage of the invention is to provide a method of measuring topology of functional liquid in a pixel and a topology measuring apparatus of functional liquid in a pixel which perform thickness measurement and/or volume measurement of the functional liquid in the pixel accurately, a liquid droplet ejection apparatus, a method of manufacturing electro-optical apparatus, an electro-optical apparatus, and an electronic apparatus.

According to an aspect of the invention, there is provided a method of measuring topology of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured by a surface topology measuring apparatus having an interferometer comprising: measuring surface topologies in which surface topology of the functional liquid in the pixel and surface topology of the bank are measured by the surface topology measuring apparatus, and measurement parameters regarding the surface topologies are generated; adding a bank height in which a height parameter corresponding to a height of the bank is added to the measurement parameter of a surface of the functional liquid in the pixel of the measurement parameter generated; and calculating topology in which at least one of thickness and volume of the functional liquid in the pixel is calculated based on the added measurement parameter of the surface of the functional liquid in the pixel and the measurement parameter of the surface of the bank.

According to another aspect of the invention, there is provided a topology measuring apparatus of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured comprising: a surface topology measuring device which measures surface topology of the functional liquid in the pixel and surface topology of the bank; a measurement parameter generating device which generates measurement parameters regarding the surface topologies based on a measurement result by the surface topology measuring device; a bank height adding device which adds a height parameter corresponding to a height of the bank to a measurement parameter of a surface of the functional liquid in the pixel of the measurement parameter generated; and a topology calculating device which calculates at least one of thickness and volume of the functional liquid in the pixel based on the added measurement parameter of the surface of the functional liquid in the pixel and the measurement parameter of the surface of the bank.

According to another aspect of the invention, there is provided a method of measuring topology of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in a pixel arrived in the pixel region is measured by a surface topology measuring apparatus having an interferometer comprising: measuring surface topologies in which surface topology of the functional liquid in the pixel and surface topology of the bank are measured by the surface topology measuring apparatus, and measurement parameters regarding the surface topologies are generated; subtracting a bank height in which a height parameter corresponding to a height of the bank is subtracted from a measurement parameter of a surface of the functional liquid in the pixel of the measurement parameter generated; and calculating topology in which at least one of thickness and volume of the functional liquid in the pixel is calculated based on the subtracted measurement parameter of the surface of the bank and the measurement parameter of the surface of the functional liquid in the pixel.

According to another aspect of the invention, there is provided a topology measuring apparatus of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured comprising: a surface topology measuring device which measures surface topology of the functional liquid in the pixel and surface topology of the bank; a measurement parameter generating device which generates measurement parameters regarding the surface topologies based on a measurement result by the surface topology measuring device; a bank height subtracting device which subtracts a height parameter corresponding to a height of the bank from measurement parameter of a surface of the functional liquid in the pixel of the measurement parameter generated; and a topology calculating device which calculates at least one of thickness and volume of the functional liquid in the pixel based on the subtracted measurement parameter of the surface of the bank and the measurement parameter of the surface of the functional liquid in the pixel.

According to these configurations, the height of the bank is designed to a predetermined height. It is possible to measure one of the thickness and the volume of the functional liquid in the pixel by measuring the surface topologies of the functional liquid in the pixel and the bank, and adding or subtracting the bank height to or from the surface of the functional liquid in the pixel. In other words, it is not necessary to transmit a measuring light from the interferometer through the functional liquid to a bottom surface of the pixel region so as to measure a height of a reverse surface of the functional liquid in the pixel, i.e., of the pixel region. Therefore, the bank can not be an obstacle. Also, when a white-light interferometer is used as an interferometer, it is not necessary to amend colors, etc., of the measuring light needed for transmitting through the functional liquid. Further, in a case that the functional liquid is impermeable, this measuring method is valid. Note that the interferometer may be a white-light interferometer or a laser interferometer, etc.

In this case, it is preferable that a measured point of the bank surface is surface treated with a light reflectivity material.

According to this configuration, as a reflectance on the bank surface is increased, it is possible to measure the surface topology of the bank with the interferometer accurately.

According to another aspect of the invention, there is provided a liquid droplet ejection apparatus comprising: the topology measuring apparatus of the functional liquid in the pixel described above; a head unit having a sub carriage on which a plurality of functional liquid droplet ejection heads is mounted; and a drawing device which draws by ejecting a functional liquid droplet from the plurality of functional liquid droplet ejection heads with a relative movement of the head unit to a substrate.

According to this configuration, as a drawing can be performed while the thickness or the volume of the functional liquid being measured, it is possible to select non-defective products or defective products by judging whether the thickness or the volume of the functional liquid is uniform or not.

In this case, the head unit has a functional liquid droplet ejection head ejecting functional liquid of red color, a functional liquid droplet ejection head ejecting functional liquid of green color, and a functional liquid droplet ejection head ejecting functional liquid of blue color.

According to this configuration, it is possible to manufacture a color filter having three colors of the functional liquids landed in the pixel regions, and to detect color heterogeneity in a color filter by the above mentioned topology measuring apparatus of the functional liquid in the pixel.

According to another aspect of the invention, there is provided a method of manufacturing an electro-optical apparatus wherein a film portion is formed with a functional liquid droplet on a workpiece using the liquid droplet ejection apparatus described above.

According to another aspect of the invention, there is provided an electro-optical apparatus wherein a film portion is formed with a functional liquid droplet on a workpiece using the liquid droplet ejection apparatus described above.

According to this configuration, it is possible to manufacture electro-optical apparatuses with high quality. Note that examples of the functional materials are: a light emitting material (a luminescent layer, a positive-hole injection layer) of an organic EL (Electro-Luminescence) apparatus, a filter material (a filter element) of the color filter used in a liquid crystal display apparatus, a fluorescent material (a fluorescent element) of an electron ejection apparatus (a Field Emission Display: FED), a fluorescent material (a fluorescent element of a PDP (a Plasma Display Panel) apparatus, and an electrophoresis element material (an electrophoresis element) of an electrophoresis display apparatus, etc. They are liquid materials capable of being ejected from a functional liquid droplet ejection head (an ink jet head). Also, there are the organic EL apparatus, the liquid crystal display apparatus, the electron ejection apparatus, the PDP apparatus, and the electrophoresis display apparatus, etc., as the electro-optical apparatus (the Flat Panel Display: FPD).

According to the other aspect of the invention, there is provided an electronic apparatus having the electro-optical apparatus manufactured by the method of the electro-optical apparatus described above or the electro-optical apparatus described above.

In this case, the electronic apparatus is directed to a cellular phone, a personal computer, and various electronic apparatuses on which a so-called flat panel display is mounted.

BRIEF DESCRIPTION OF THE DRAWING

The invention will be described with reference to the accompanying drawings, wherein like numbers reference like elements.

FIG. 3 is a functional block diagram of a control computer.

FIGS. 4A to 4D are explanatory views showing a series of operations for a method of measuring topology of the functional liquid in the pixel according to the embodiment of the invention.

FIG. 22 is a sectional view illustrating an essential part of an electron emission display apparatus (FED apparatus).

DESCRIPTION OF EXEMPLARY EMBODIMENTS

Hereinafter, a topology measuring apparatus and a method of measuring of functional liquid in a pixel according to an embodiment of the invention will be described with reference to the accompanying drawings. The topology measuring apparatus of functional liquid in the pixel measures thickness or volume of the functional liquid in the pixel arrived in a pixel region on a substrate and detects color heterogeneity in a color filter, etc., based on the fact whether the thickness or the volume of the functional liquids in the adjacent pixels are uniform or not. First, the color filter will be explained which is to be a tested object.

Figure 1A:
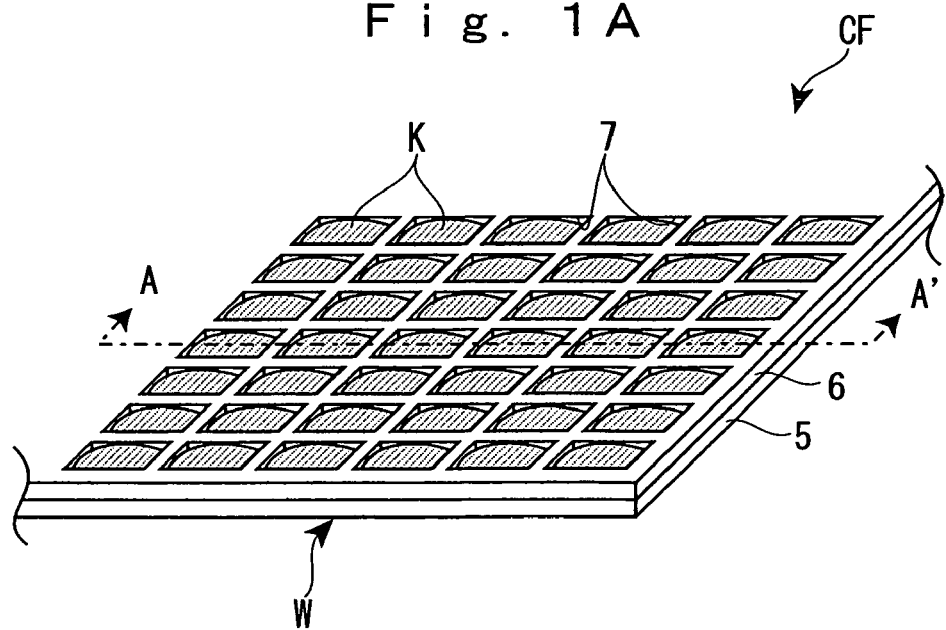
FIG. 1A is an appearance perspective view of a color filter as a tested object with a topology measuring apparatus of functional liquid in a pixel according to an embodiment of the invention.
Figure 1B:
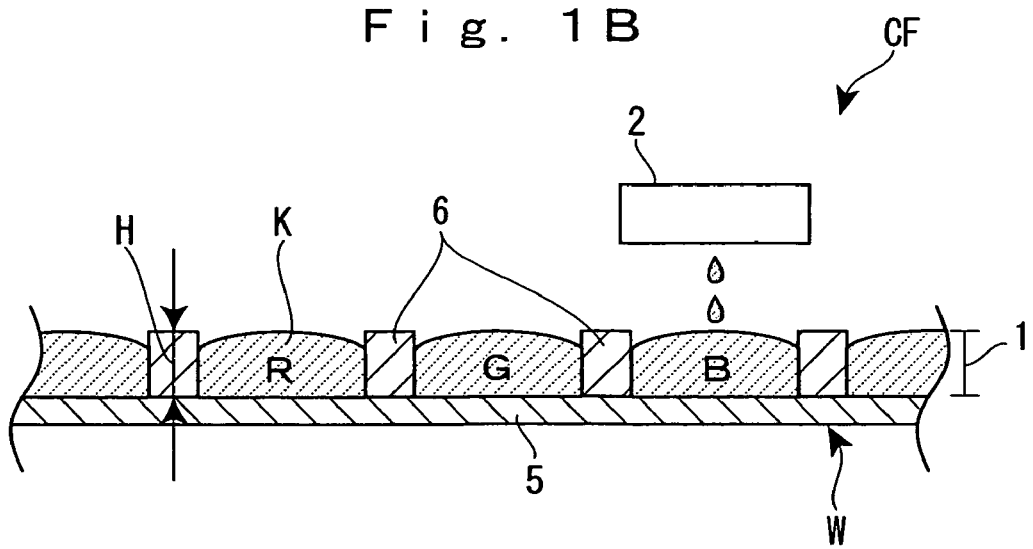
FIG. 1B is a cross sectional view along A-A' line of the color filter.

As shown in FIGS. 1A and 1B, a color filter CF has a substrate W and a color layer 1 including functional liquids K with colors of R, G and B arrived on the substrate W. The color layer 1 has arrangement pattern such as a mosaic, stripe, delta, etc. In other words, the color filter CF is formed on the substrate W drawn by a head unit having three types of functional liquid droplet ejection heads 2, each of which ejects the corresponding functional liquid droplet of colors R, G or B.

The substrate W has a substrate body 5 in a form of square and a bank 6 formed thereon in a form of matrix. The bank 6 serves as partition walls defining each of pixel regions 7. The bank 6 is designed such that a height from a surface of the substrate body 5 is set to a predetermined bank height H, and a part or a whole of a surface (an upper surface) thereof is surface treated with a light reflectivity material, thereby enhancing a light reflectance by a white-color interferometer 11 (explained later). With these designs, it is possible to measure a surface topology (a surface height) of the bank 6 by the white-color interferometer 11 with high accuracy. When each of the functional liquid droplet ejection heads 2 ejects the corresponding functional liquid droplet, i.e., a filter material into each of pixel regions 7, the arrived functional liquid droplet is retained as the functional liquid K in each of pixel regions 7, the color layer 1 is formed in each of the pixel regions 7, and a film is formed by a drying process, leading to form each of the pixels of the color filter CF.

Figure 2:
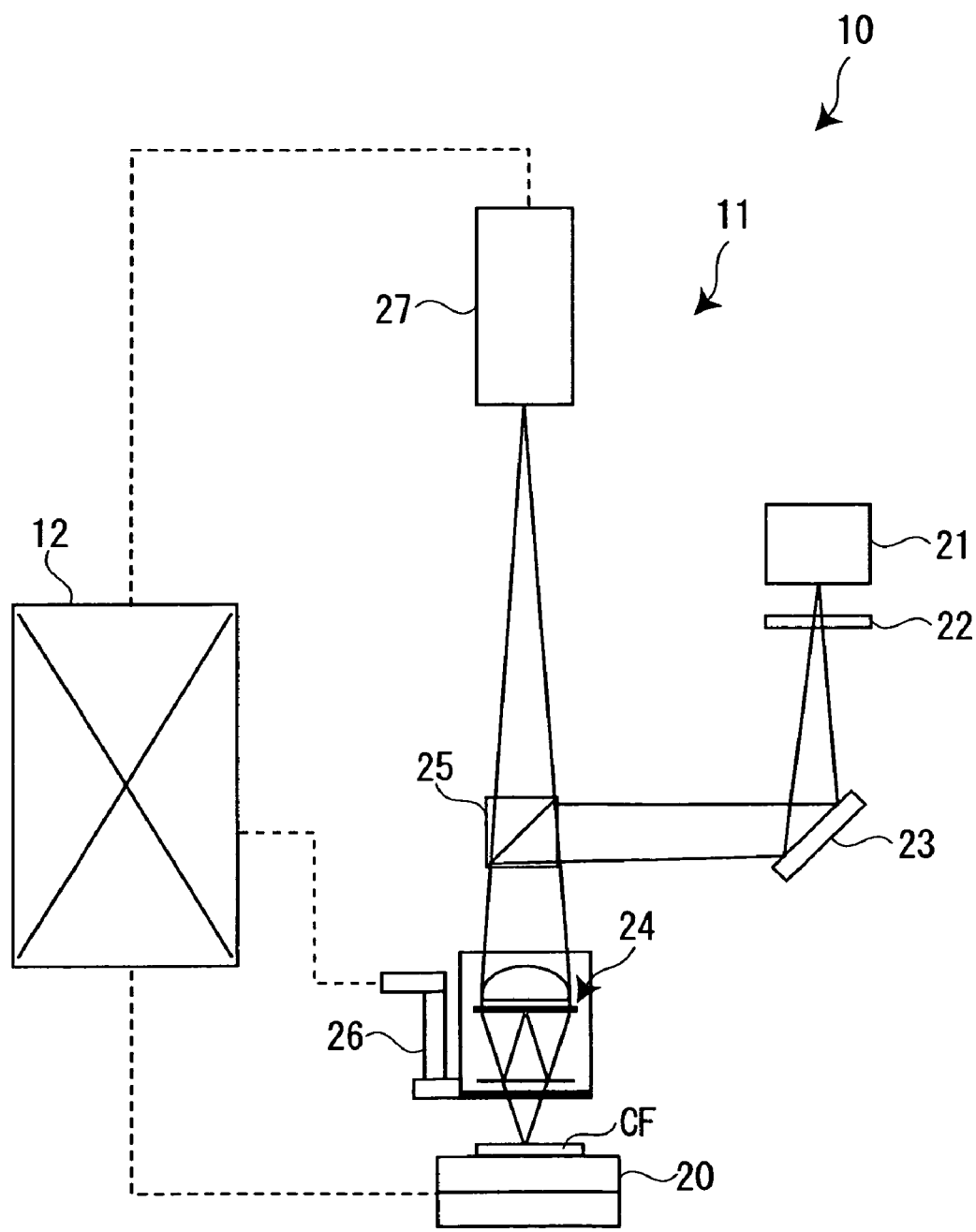
FIG. 2 is a diagram of the topology measuring apparatus of the functional liquid in the pixel according to the embodiment of the invention.
Figure 5A:
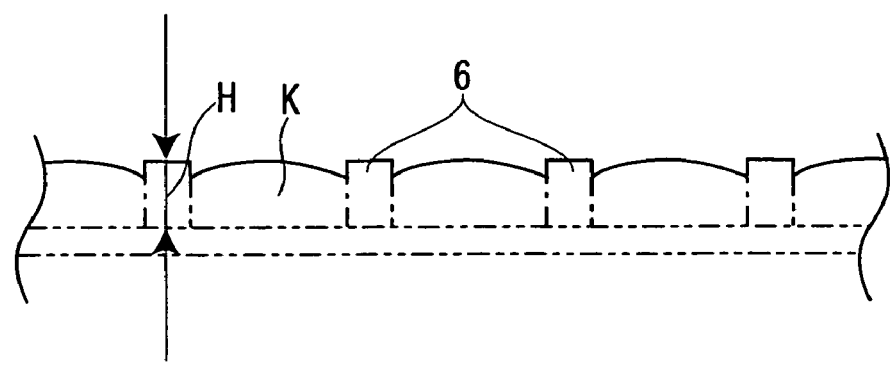
FIGS. 5A to 5D are explanatory views showing a series of operations for a method of measuring topology of the functional liquid in the pixel according to the second embodiment of the invention.
Figure 5B:
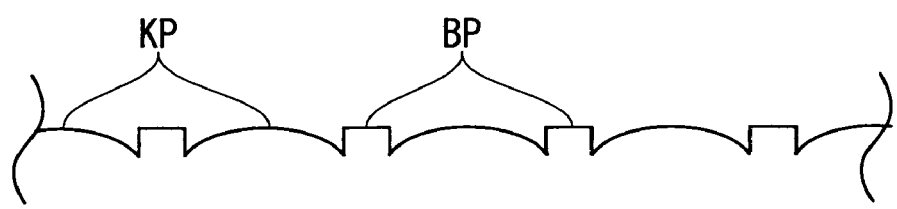
Figure 5C:
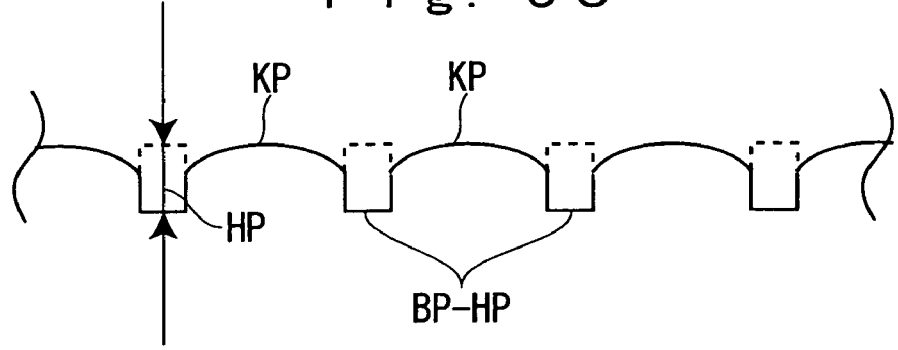
Figure 5D:
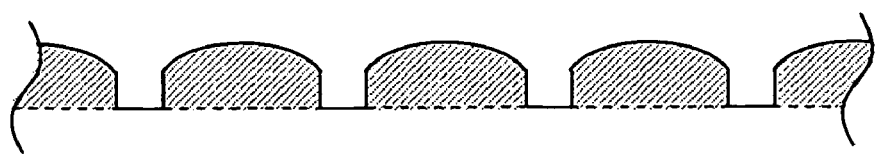

Next, referring to FIG. 2, a topology measuring apparatus 10 of the functional liquid K in the pixel will be explained, the apparatus measuring the thickness or the volume of the functional liquid K in the pixel arrived in the pixel region 7. The topology measuring apparatus 10 has the white-color interferometer 11 (a surface topology measurement device) measuring surface topology of the color filter CF, and a control computer 12 analyzing a measurement result from the white-color interferometer 11 to calculate the thickness or the volume of the functional liquid K in the pixel and controlling the white-color interferometer 11. In this embodiment of the invention, though the white-color interferometer 11 is used to shorten the measurement time, without this limitation, a laser interferometer, etc., may be used. For the timing for measuring the thickness or the volume of the functional liquid K in the pixel, it may be just after the drawing on the substrate W or after the drying process.

The white-color interferometer 11 includes: an XY table 20 on which the color filter CF is mounted freely movable in a plane surface thereof; a white-color LED 21 as a light source emitting a white light; an interference filter 22 (a band pass filter) provided at a downstream side in a radiated direction of a white-color LED 21 and filtering white light; a reflector 23 provided at a downstream side of the interference filter 22 and reflecting the white light orthogonally; a beam splitter 25 provided at a downstream side of the reflector 23 and reflecting the white light orthogonally towards an interference type objective lens (Mirau type) described later, while transmitting a reflected light reflected from the color filter CF; the interference type objective lens 24 provided at a downstream side of the beam splitter 25, a piezo-Z axis table 26 making the interference type objective lens 24 vibrate minutely; and an imaging camera (a CCD camera) 27 taking images of reflected light reflected from the color filter CF via the interference type objective lens 24 and the beam splitter 25.

The XY table 20 is a precision table capable of moving in minute manner and is drive-controlled by the control computer 12. The color filter CF mounted thereon is moved in an X axis direction and a Y axis direction. Also, the piezo-Z axis table is drive-controlled by the control computer 12 and is vibrated when measuring.

As shown in FIG. 3, the control computer 12 has: an image processor 30 analyzing a taken image by the imaging camera 27; a measurement parameter generator 31 quantifying (in data basis) the surface topology of the substrate W measured as a measurement parameter P based on an image analysis by the image processor 30; a bank height adder 32 adding the measurement parameter P for the surface of the functional liquid K in the pixel of the generated measurement parameter P with a height parameter HP corresponding to a bank height; a topology calculator 33 calculating the thickness or the volume of the functional liquid K in the pixel based on the measurement parameter P for the surface of the functional liquid K in the pixel after addition and the measurement parameter P for the surface of the bank 6; a table drive controller 34 drive controlling the XY table 20; and a piezo-drive controller 35 drive controlling the piezo-Z axis table 26.

Hereinafter, a series of operations regarding a method of measuring topology of the functional liquid K in the pixel will be explained with FIGS. 4A to 4D, the thickness or the volume of the functional liquid K in the pixel being measured. Firstly, the color filter CF is positioned on the XY table 20 to be mounted thereon. Next, when the white-color LED 21 emits white light on the color filter CF, the interference type objective lens 24 is vibrated by the piezo-Z axis table 26 while the XY table 20 is moved and the imaging camera 27 takes an image of the white light reflected on the color filter CF (refer to FIG. 4A).

The taken image is analyzed by the image processor 30 in the control computer 12 and the surface topology thereof is quantified as a measurement parameter P by the measurement parameter generator 31 (refer to FIG. 4B). The measurement parameter P includes a bank parameter BP for the surface of the bank 6 and a functional liquid parameter KP for the surface of the functional liquid K in the pixel.

When the measurement parameter P is generated, the functional liquid parameter KP is added with the parameter HP corresponding to the bank height on the design basis (refer to FIG. 4C). This makes the bank parameter BP of the measurement parameter P a parameter corresponding to the bottom surface of the pixel region 7. The thickness or the volume of the functional liquid K in the pixel is calculated by the topology calculator 33 based on the bank parameter BP and the functional liquid parameter KP after the addition (refer to FIG. 4D).

When manufacturing the color filter CF by the head unit having a plurality of functional liquid droplet ejection heads 2 with relative reciprocations of the unit in a main scanning direction and a sub scanning direction, color heterogeneity (stripe heterogeneity) sometimes occurs at switching between one direction and the other direction in the main scanning direction of the head unit. Preferably, the thicknesses or the volumes of the functional liquid K in the adjacent pixels at switching are measured respectively, and the occurrence of the color heterogeneity is judged by comparing a measured value based on the difference of the thicknesses or the volumes with a threshold value for the color heterogeneity.

According to the configuration above, as the bank height H is a predetermined height on the design basis, the bank parameter BP corresponds to a parameter at the bottom surface of the pixel region 7 by adding the functional liquid parameter KP of the measurement parameter P for the measured surface topology of the color filter CF with the height parameter HP of the bank 6. Therefore, the thickness or the volume of the functional liquid K in the pixel can be measured based on the functional liquid parameter KP and the bank parameter BP. It is possible to measure the thickness or the volume of the functional liquid K of each of the pixels by only measuring the surface topology of the color filter CF, and it is not necessary to measure the bottom surface of the pixel region 7 with the white light from the white-color interferometer 11 which transmits to the functional liquid. In other words, it is not necessary to consider an emitting angle of the white light, and to amend physical data and a refractive factor, etc., of the functional liquid K needed at the time of transmission through the functional liquid K. In a case that the functional liquid K in the pixel is impermeable, this measuring method is valid. With this method, it is possible to measure the thickness or the volume of the functional liquid K in each of the pixels of the color filter CF, making it possible to detect color heterogeneity.

It is possible to assemble the topology measuring apparatus 10 of the functional liquid K in the pixel according to the invention in a liquid droplet ejection apparatus in which a head unit having a plurality of functional liquid droplet ejection heads 2 moves to draw on the substrate W. At this time, it is preferable that an XY table of the liquid droplet ejection apparatus is used as the above mentioned XY table 20.

Next, a topology measuring apparatus 10 of the functional liquid K in a pixel and a method of measuring topology thereof according to the second embodiment will be explained. To avoid the duplicate description, only different parts will be explained. A topology measuring apparatus 10 has a bank height subtractor in place of the bank height adder 32 in the first embodiment, which subtracts a height parameter HP corresponding to a bank height from a bank parameter BP of a measurement parameter P.

Referring to FIGS. 5A to 5D, the method of measuring topology of the functional liquid K in the pixel will be explained. A surface topology of a color filter CF is measured by a white-color interferometer 11 (refer to FIG. 5A), a measurement parameter P regarding the surface topology is generated (refer to FIG. 5B), the height parameter HP corresponding to the bank height is subtracted from the bank parameter BP of the measurement parameter P by the bank height subtractor (refer to FIG. 5C). Then, thickness or volume of the functional liquid K in the pixel is calculated based on a functional liquid parameter KP and the subtracted bank parameter BP (refer to FIG. 5D). With this configuration, it is also possible to measure the thickness or the volume of the functional liquid K in the pixel, with only the measurement for the surface topology of the color filter CF.

Taking electro-optical apparatuses (flat panel display apparatuses) manufactured using the liquid droplet ejection apparatus having a topology measuring apparatus 10 of the embodiment assembled therein and active matrix substrates formed on the electro-optical apparatuses as display apparatuses as examples, configurations and manufacturing methods thereof will now be described. Examples of the electro-optical apparatuses include a color filter, a liquid crystal display apparatus, an organic EL apparatus, a plasma display apparatus (PDP (plasma display panel) apparatus), and an electron emission apparatus (FED (field emission display) apparatus and SED (surface-conduction electron emitter display) apparatus). Note that the active matrix substrate includes thin-film transistors, source lines and data lines which are electrically connected to the thin film transistors.

Figure 6:
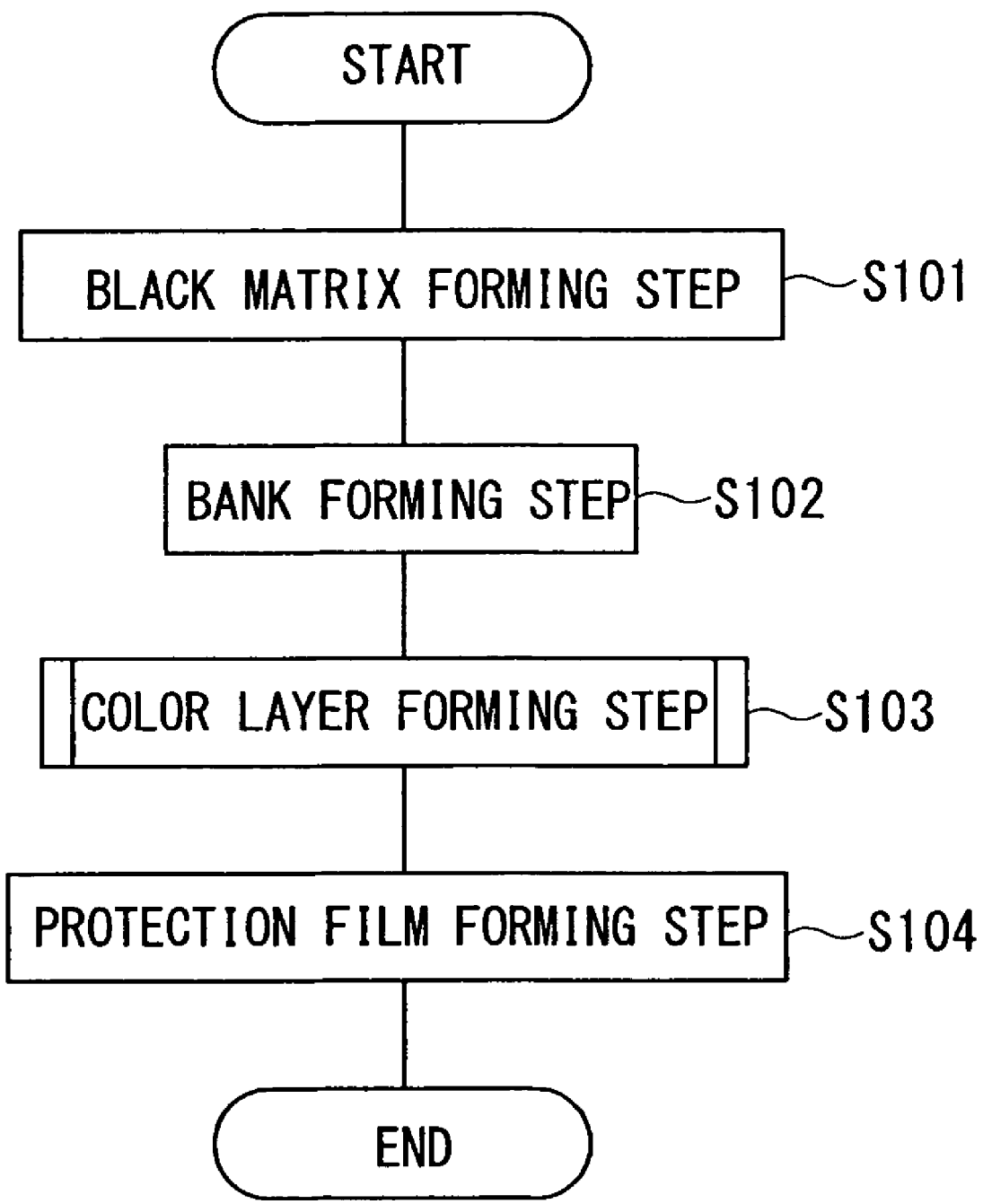
FIG. 6 is a flowchart illustrating manufacturing steps of the color filter.

First, a manufacturing method of a color filter incorporated in a liquid crystal display apparatus or an organic EL apparatus, etc., will be described. FIG. 6 shows a flowchart illustrating manufacturing steps of a color filter. FIGS. 7A to 7E are sectional views of the color filter 500 (a filter substrate 500A) of this embodiment shown in an order of the manufacturing steps.

Figure 7A:
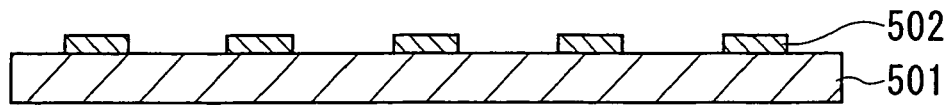
FIGS. 7A to 7E are sectional views schematically illustrating the color filter showing in an order of manufacturing steps.

In a black matrix forming step (step S101), as shown in FIG. 7A, a black matrix 502 is formed on the substrate (W) 501. The black matrix 502 is formed of a chromium metal, a laminated body of a chromium metal and a chromium oxide, or a resin black, for example. The black matrix 502 may be formed of a thin metal film by a sputtering method or a vapor deposition method. Alternatively, the black matrix 502 may be formed of a thin resin film by a gravure printing method, a photoresist method, or a thermal transfer method.

Figure 7B:
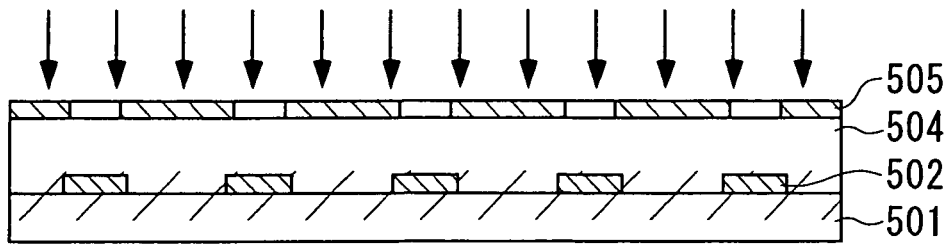

In a bank forming step (step S102), the bank 503 is formed so as to be superposed on the black matrix 502. Specifically, as shown in FIG. 7B, a resist layer 504 which is formed of a transparent negative photosensitive resin is formed so as to cover the substrate 501 and the black matrix 502. An upper surface of the resist layer 504 is covered with a mask film 505 formed in a matrix pattern. In this state, exposure processing is performed.

Figure 7C:
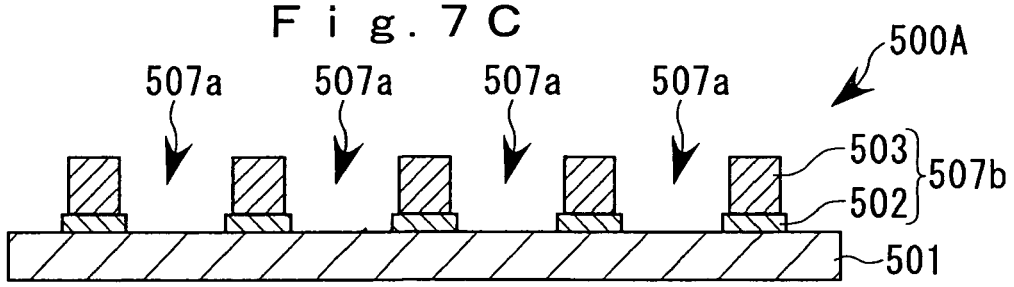

Furthermore, as shown in FIG. 7C, the resist layer 504 is patterned by performing etching processing on portions of the resist layer 504 which are not exposed, and the bank 503 is thus formed. Note that when the black matrix 502 is formed of a resin black, the black matrix 502 also serves as a bank.

The bank 503 and the black matrix 502 disposed beneath the bank 503 serve as a partition wall 507b for partitioning the pixel areas 507a. The partition wall 507b defines receiving areas for receiving the functional liquid droplet ejected when the functional liquid droplet ejection heads 2 form coloring layers (film portions) 508R, 508G, and 508B in a subsequent coloring layer forming step.

The filter substrate 500A is obtained through the black matrix forming step and the bank forming step.

Note that, in this embodiment, a resin material having a lyophobic (hydrophobic) film surface is used as a material of the bank 503. Since a surface of the substrate (glass substrate) 501 is lyophilic (hydrophilic), variation of positions to which the liquid droplet is projected in the each of the pixel areas 507a surrounded by the bank 503 (partition wall 507b) can be automatically corrected in the subsequent coloring layer forming step.

Figure 7D:
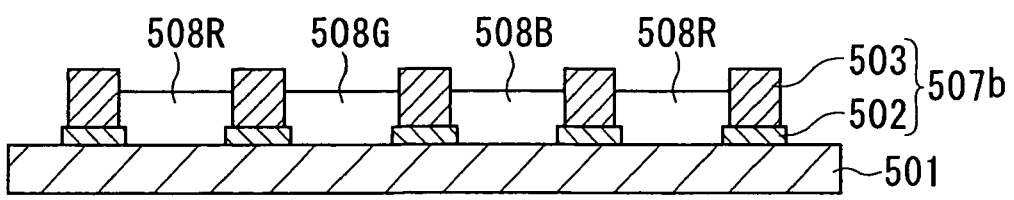

In the coloring layer forming step (S103), as shown in FIG. 7D, the functional liquid droplet ejection heads 2 eject the functional liquid within the pixel areas 507a each of which are surrounded by the partition wall 507b. In this case, the functional liquid droplet ejection heads 2 eject functional liquid droplets using functional liquids (filter materials) of colors R, G, and B. A color scheme pattern of the three colors R, G, and B may be the stripe arrangement, the mosaic arrangement, or the delta arrangement.

Figure 7E:
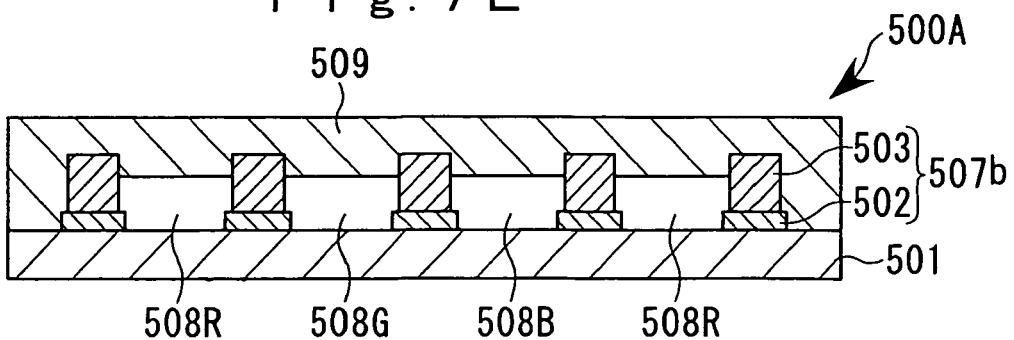

Then, drying processing (such as heat treatment) is performed so that the three color functional liquids are fixed, and thus three coloring layers 508R, 508G, and 508B are formed. Thereafter, a protective film forming step is reached (step S104). As shown in FIG. 7E, a protective film 509 is formed so as to cover surfaces of the substrate 501, the partition wall 507b, and the three coloring layers 508R, 508G, and 508B.

That is, after coating liquid used for the protective film is ejected onto the entire surface of the substrate 501 on which the coloring layers 508R, 508G, and 508B are formed and the drying process is performed, the protective film 509 is formed.

In the manufacturing method of the color filter 500, after the protective film 509 is formed, a coating step is performed in which ITO (Indium Tin Oxide) serving as a transparent electrode in the subsequent step is coated.

Figure 8:
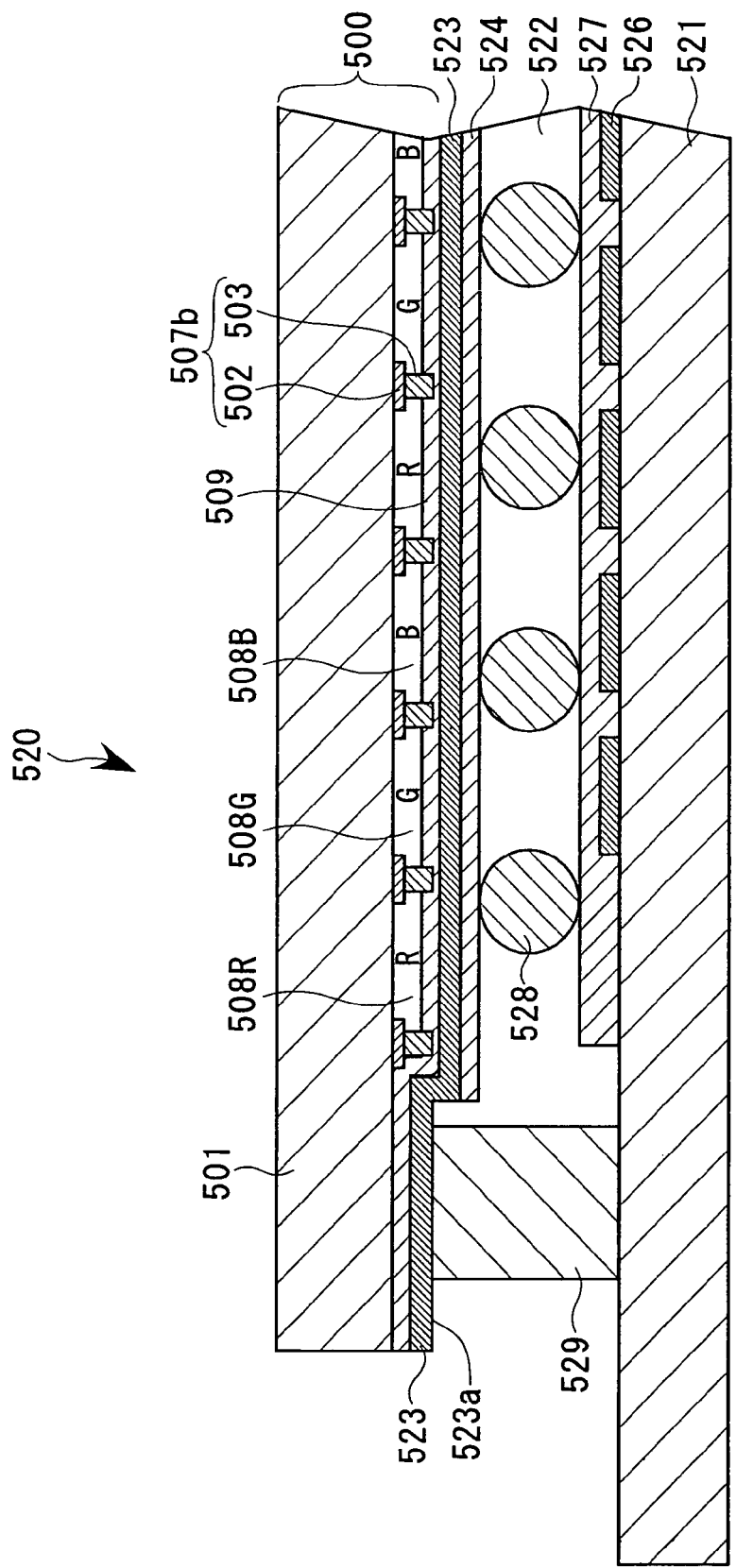
FIG. 8 is a sectional view schematically illustrating an essential part of a first liquid crystal display apparatus employing the color filter according to the embodiment of the invention.

FIG. 8 is a sectional view of an essential part of a passive matrix liquid crystal display apparatus (liquid crystal display apparatus 520) and schematically illustrates a configuration thereof as an example of a liquid crystal display apparatus employing the color filter 500. A transmissive liquid crystal display apparatus as a final product can be obtained by disposing a liquid crystal driving IC (integrated circuit), a backlight, and additional components such as supporting members on the display apparatus 520. Note that the color filter 500 is the same as that shown in FIG. 7, and therefore, reference numerals the same as those used in FIG. 7 are used in FIG. 8 to denote the same components, and descriptions thereof are omitted.

The display apparatus 520 includes the color filter 500, a counter substrate 521 such as a glass substrate, and a liquid crystal layer 522 formed of STN (super twisted nematic) liquid crystal compositions sandwiched therebetween. The color filter 500 is disposed on the upper side of FIG. 8 (on an observer side).

Although not shown, polarizing plates are disposed so as to face an outer surface of the counter substrate 521 and an outer surface of the color filter 500 (surfaces which are remote from the liquid crystal layer 522). A backlight is disposed so as to face an outer surface of the polarizing plate disposed near the counter substrate 521.

A plurality of rectangular first electrodes 523 extending in a horizontal direction in FIG. 8 are formed with predetermined intervals therebetween on a surface of the protective film 509 (near the liquid crystal layer 522) of the color filter 500. A first alignment layer 524 is arranged so as to cover surfaces of the first electrodes 523 which are surfaces remote from the color filter 500.

On the other hand, a plurality of rectangular second electrodes 526 extending in a direction perpendicular to the first electrodes 523 disposed on the color filter 500 are formed with predetermined intervals therebetween on a surface of the counter substrate 521 which faces the color filter 500. A second alignment layer 527 is arranged so as to cover surfaces of the second electrodes 526 near the liquid crystal layer 522. The first electrodes 523 and the second electrodes 526 are formed of a transparent conductive material such as an ITO.

A plurality of spacers 528 disposed in the liquid crystal layer 522 are used to maintain the thickness (cell gap) of the liquid crystal layer 522 constant. A seal member 529 is used to prevent the liquid crystal compositions in the liquid crystal layer 522 from leaking to the outside. Note that an end of each of the first electrodes 523 extends beyond the seal member 529 and serves as wiring 523a.

Pixels are formed at intersections of the first electrodes 523 and the second electrodes 526. The coloring layers 508R, 508G, and 508B are arranged on the color filter 500 so as to correspond to the pixels.

In normal manufacturing processing, the first electrodes 523 are patterned and the first alignment layer 524 is applied on the color filter 500 whereby a first half portion of the display apparatus 520 on the color filter 500 side is manufactured. Similarly, the second electrodes 526 are patterned and the second alignment layer 527 is applied on the counter substrate 521 whereby a second half portion of the display apparatus 520 on the counter substrate 521 side is manufactured. Thereafter, the spacers 528 and the seal member 529 are formed on the second half portion, and the first half portion is attached to the second half portion. Then, liquid crystal to be included in the liquid crystal layer 522 is injected from an inlet of the seal member 529, and the inlet is sealed. Finally, the polarizing plates and the backlight are disposed.

The liquid droplet ejection apparatus of this embodiment may apply a spacer material (functional liquid) constituting the cell gap, for example, and uniformly apply liquid crystal (functional liquid) to an area sealed by the seal member 529 before the first half portion is attached to the second half portion. Furthermore, the seal member 529 may be printed using the functional liquid droplet ejection heads 2. Moreover, the first alignment layer 524 and the second alignment layer 527 may be applied using the functional liquid droplet ejection heads 2.

Figure 9:
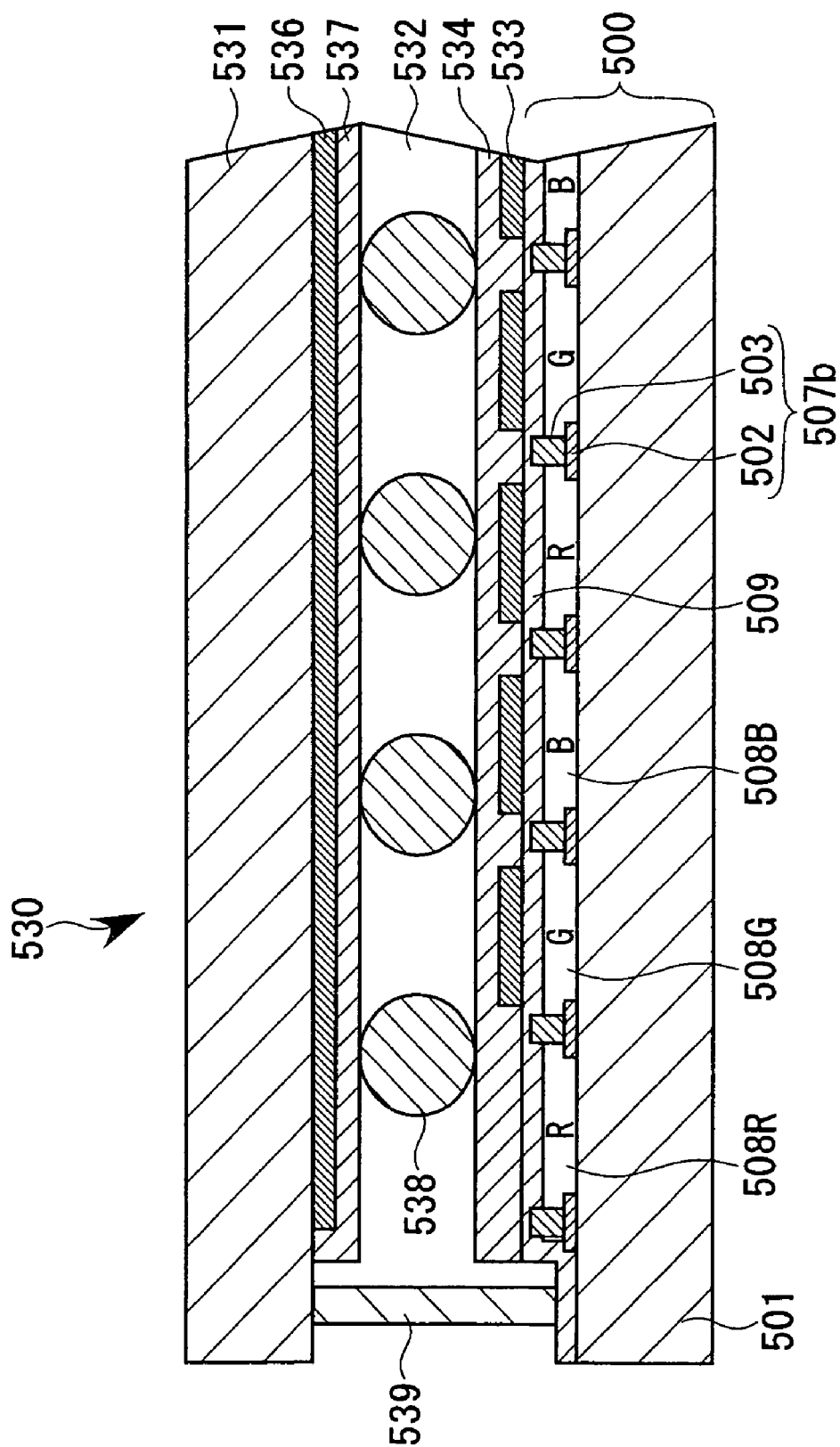
FIG. 9 is a sectional view schematically illustrating an essential part of a liquid crystal display apparatus employing the color filter according to the second embodiment of the invention.

FIG. 9 is a sectional view of an essential part of a display apparatus 530 and schematically illustrates a configuration thereof as a second example of a liquid crystal display apparatus employing the color filter 500 which is manufactured in this embodiment.

The display apparatus 530 is considerably different from the display apparatus 520 in that the color filter 500 is disposed on a lower side in FIG. 9 (remote from the observer).

The display apparatus 530 is substantially configured such that a liquid crystal layer 532 constituted by STN liquid crystal is arranged between the color filter 500 and a counter substrate 531 such as a glass substrate. Although not shown, polarizing plates are disposed so as to face an outer surface of the counter substrate 531 and an outer surface of the color filter 500.

A plurality of rectangular first electrodes 533 extending in a depth direction of FIG. 9 are formed with predetermined intervals therebetween on a surface of the protective film 509 (near the liquid crystal layer 532) of the color filter 500. A first alignment layer 534 is arranged so as to cover surfaces of the first electrodes 533 which are surfaces near the liquid crystal layer 532.

On the other hand, a plurality of rectangular second electrodes 536 extending in a direction perpendicular to the first electrodes 533 disposed on the color filter 500 are formed with predetermined intervals therebetween on a surface of the counter substrate 531 which faces the color filter 500. A second alignment layer 537 is arranged so as to cover surfaces of the second electrodes 536 near the liquid crystal layer 532.

A plurality of spacers 538 disposed in the liquid crystal layer 532 are used to maintain the thickness (cell gap) of the liquid crystal layer 532 constant. A seal member 539 is used to prevent the liquid crystal compositions in the liquid crystal layer 532 from leaking to the outside.

As with the display apparatus 520, pixels are formed at intersections of the first electrodes 533 and the second electrodes 536. The coloring layers 508R, 508G, and 508B are arranged on the color filter 500 so as to correspond to the pixels.

Figure 10:
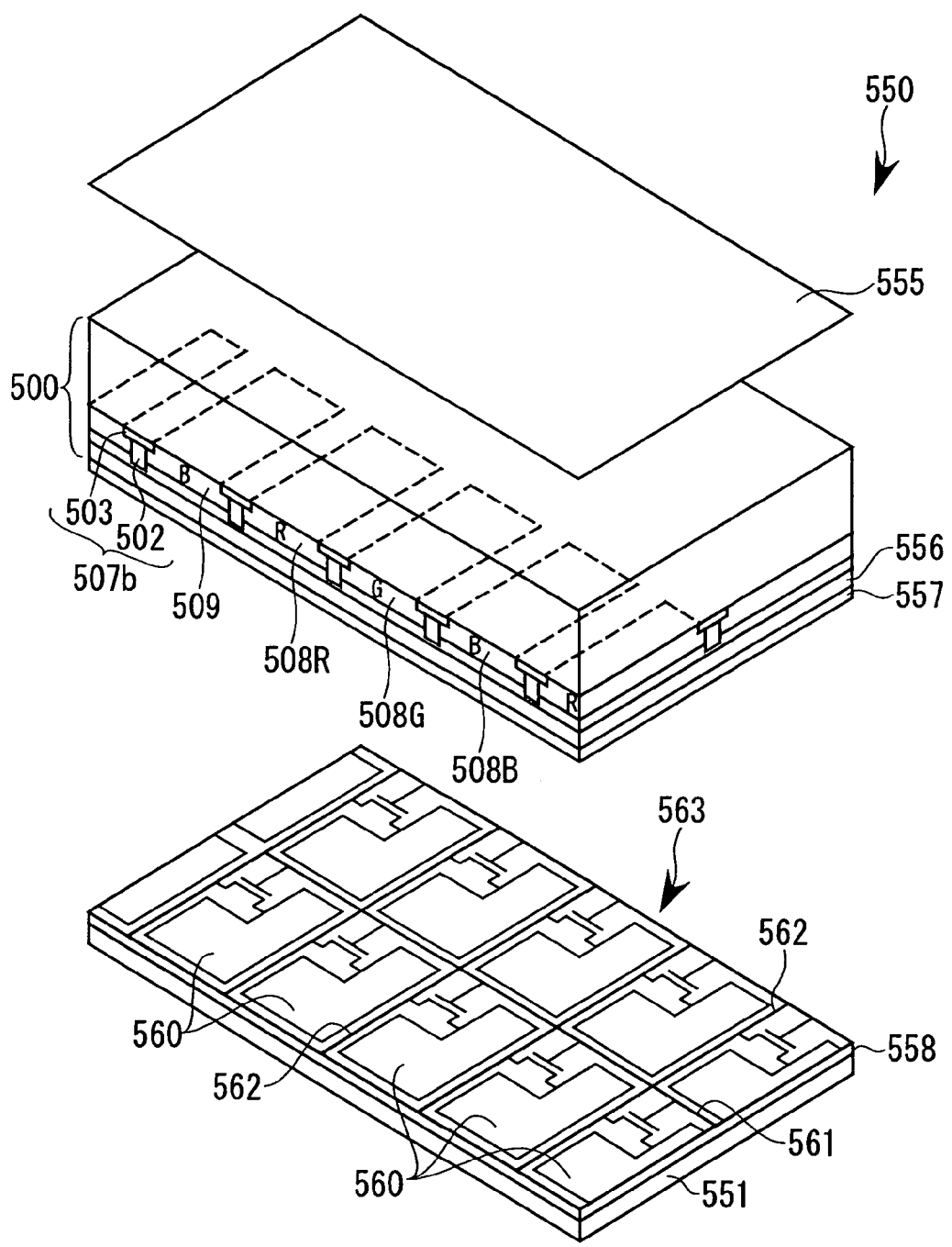
FIG. 10 is a sectional view schematically illustrating an essential part of a liquid crystal display apparatus employing the color filter according to the third embodiment of the invention.

FIG. 10 is an exploded perspective view of a transmissive TFT (thin film transistor) liquid crystal display device and schematically illustrates a configuration thereof as a third example of a liquid crystal display apparatus employing the color filter 500 to which the present invention is applied.

A liquid crystal display apparatus 550 has the color filter 500 disposed on the upper side of FIG. 10 (on the observer side).

The liquid crystal display apparatus 550 includes the color filter 500, a counter substrate 551 disposed so as to face the color filter 500, a liquid crystal layer (not shown) interposed therebetween, a polarizing plate 555 disposed so as to face an upper surface of the color filter 500 (on the observer side), and a polarizing plate (not shown) disposed so as to face a lower surface of the counter substrate 551.

An electrode 556 used for driving the liquid crystal is formed on a surface of the protective film 509 (a surface near the counter substrate 551) of the color filter 500. The electrode 556 is formed of a transparent conductive material such as an ITO and entirely covers an area in which pixel electrodes 560 are to be formed which will be described later. An alignment layer 557 is arranged so as to cover a surface of the electrode 556 remote from the pixel electrode 560.

An insulating film 558 is formed on a surface of the counter substrate 551 which faces the color filter 500. On the insulating film 558, scanning lines 561 and signal lines 562 are arranged so as to intersect with each other. Pixel electrodes 560 are formed in areas surrounded by the scanning lines 561 and the signal lines 562. Note that an alignment layer (not shown) is arranged on the pixel electrodes 560 in an actual liquid crystal display apparatus.

Thin-film transistors 563 each of which includes a source electrode, a drain electrode, a semiconductor layer, and a gate electrode are incorporated in areas surrounded by notch portions of the pixel electrodes 560, the scanning lines 561, and the signal lines 562. When signals are supplied to the scanning lines 561 and the signal lines 562, the thin-film transistors 563 are turned on or off so that power supply to the pixel electrodes 560 is controlled.

Note that although each of the display apparatuses 520, 530, and 550 is configured as a transmissive liquid crystal display apparatus, each of the display apparatuses 520, 530, and 550 may be configured as a reflective liquid crystal display apparatus having a reflective layer or a semi-transmissive liquid crystal display apparatus having a semi-transmissive reflective layer.

Figure 11:
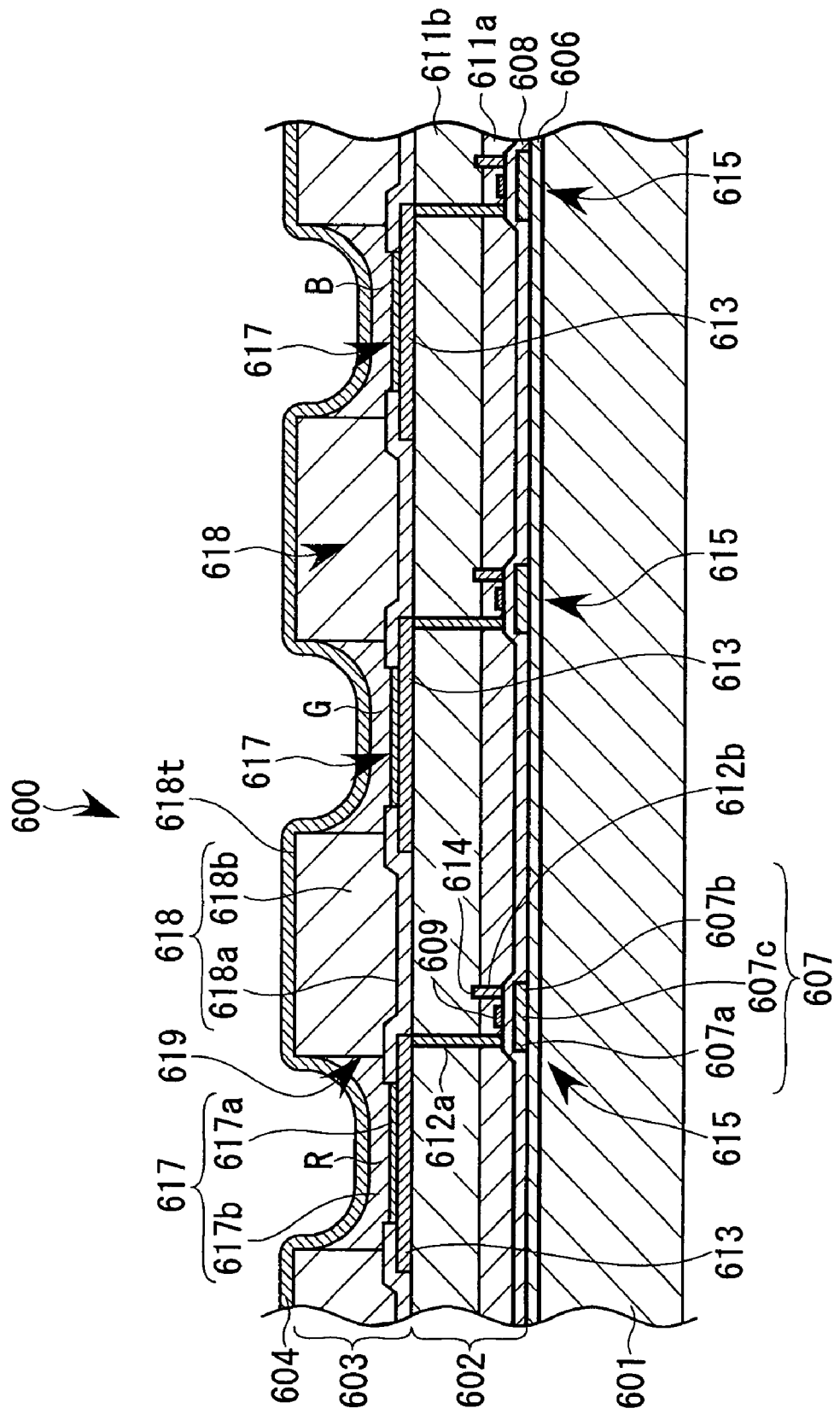
FIG. 11 is a sectional view illustrating an essential part of a display apparatus as an organic EL display apparatus.

FIG. 11 is a sectional view illustrating an essential part of a display area of an organic EL apparatus (hereinafter simply referred to as a display apparatus 600).

In this display apparatus 600, a circuit element portion 602, a light-emitting element portion 603, and a cathode 604 are laminated on a substrate (W) 601.

In this display apparatus 600, light is emitted from the light-emitting element portion 603 through the circuit element portion 602 toward the substrate 601 and eventually is emitted to an observer side. In addition, light emitted from the light-emitting element portion 603 toward an opposite side of the substrate 601 is reflected by the cathode 604, and thereafter passes through the circuit element portion 602 and the substrate 601 to be emitted to the observer side.

An underlayer protective film 606 formed of a silicon oxide film is arranged between the circuit element portion 602 and the substrate 601. Semiconductor films 607 formed of polysilicon oxide films are formed on the underlayer protective film 606 (near the light-emitting element portion 603) in an isolated manner. In each of the semiconductor films 607, a source region 607*a* and a drain region 607*b* are formed on the left and right sides thereof, respectively, by high-concentration positive-ion implantation. The center portion of each of the semiconductor films 607 which is not subjected to high-concentration positive-ion implantation serves as a channel region 607*c*.

In the circuit element portion 602, the underlayer protective film 606 and a transparent gate insulating film 608 covering the semiconductor films 607 are formed. Gate electrodes 609 formed of, for example, Al, Mo, Ta, Ti, or W are disposed on the gate insulating film 608 so as to correspond to the channel regions 607*c* of the semiconductor films 607. A first transparent interlayer insulating film 611*a* and a second transparent interlayer insulating film 611*b* are formed on the gate electrodes 609 and the gate insulating film 608. Contact holes 612*a* and 612*b* are formed so as to penetrate the first interlayer insulating film 611*a* and the second interlayer insulating film 611*b* and to be connected to the source region 607*a* and the drain region 607*b* of the semiconductor films 607.

Transparent pixel electrodes 613 which are formed of ITOs, for example, and which are patterned to have a predetermined shape are formed on the second interlayer insulating film 611b. The pixel electrode 613 is connected to the source region 607a through the contact holes 612a.

Power source lines 614 are arranged on the first interlayer insulating film 611a. The power source lines 614 are connected through the contact holes 612b to the drain region 607b.

As shown in FIG. 11, the circuit element portion 602 includes thin-film transistors 615 connected to drive the respective pixel electrodes 613.

The light-emitting element portion 603 includes functional layers 617 each formed on a corresponding one of pixel electrodes 613, and bank portions 618 which are formed between the pixel electrodes 613 and the functional layers 617 and which are used to partition the functional layers 617 from one another.

The pixel electrodes 613, the functional layers 617, and the cathode 604 formed on the functional layers 617 constitute the light-emitting element. Note that the pixel electrodes 613 are formed into a substantially rectangular shape in plan view by patterning, and the bank portions 618 are formed so that each two of the pixel electrodes 613 sandwich a corresponding one of the bank portions 618.

Each of the bank portions 618 includes an inorganic bank layer 618a (first bank layer) formed of an inorganic material such as SiO, $SiO_2$, or $TiO_2$, and an organic bank layer 618b (second bank layer) which is formed on the inorganic bank layer 618a and has a trapezoidal shape in a sectional view. The organic bank layer 618b is formed of a resist, such as an acrylic resin or a polyimide resin, which has an excellent heat resistance and an excellent lyophobic characteristic. A part of each of the bank portions 618 overlaps peripheries of corresponding two of the pixel electrodes 613 which sandwich each of the bank portions 618.

Openings 619 are formed between the bank portions 618 so as to gradually increase in size upwardly.

Each of the functional layers 617 includes a positive-hole injection/transport layer 617a formed so as to be laminated on the pixel electrodes 613 and a light-emitting layer 617b formed on the positive-hole injection/transport layer 617a. Note that another functional layer having another function may be arranged so as to be arranged adjacent to the light-emitting layer 617b. For example, an electronic transport layer may be formed.

The positive-hole injection/transport layer 617a transports positive holes from a corresponding one of the pixel electrodes 613 and injects the transported positive holes to the light-emitting layer 617b. The positive-hole injection/transport layer 617a is formed by ejection of a first composition (functional liquid) including a positive-hole injection/transport layer forming material. The positive-hole injection/transport layer forming material may be a known material.

The light-emitting layer 617b is used for emission of light having colors red (R), green (G), or blue (B), and is formed by ejection of a second composition (functional liquid) including a material for forming the light-emitting layer 617b (light-emitting material). As a solvent of the second composition (nonpolar solvent), a known material which is insoluble to the positive-hole injection/transport layer 617a is preferably used. Since such a nonpolar solvent is used as the second composition of the light-emitting layer 617b, the light-emitting layer 617b can be formed without dissolving the positive-hole injection/transport layer 617a again.

The light-emitting layer 617b is configured such that the positive holes injected from the positive-hole injection/transport layer 617a and electrons injected from the cathode 604 are recombined in the light-emitting layer 617b so as to emit light.

The cathode 604 is formed so as to cover an entire surface of the light-emitting element portion 603, and in combination with the pixel electrodes 613, supplies current to the functional layers 617. Note that a sealing member (not shown) is arranged on the cathode 604.

Steps of manufacturing the display apparatus 600 will now be described with reference to FIGS. 12 to 20.

Figure 12:
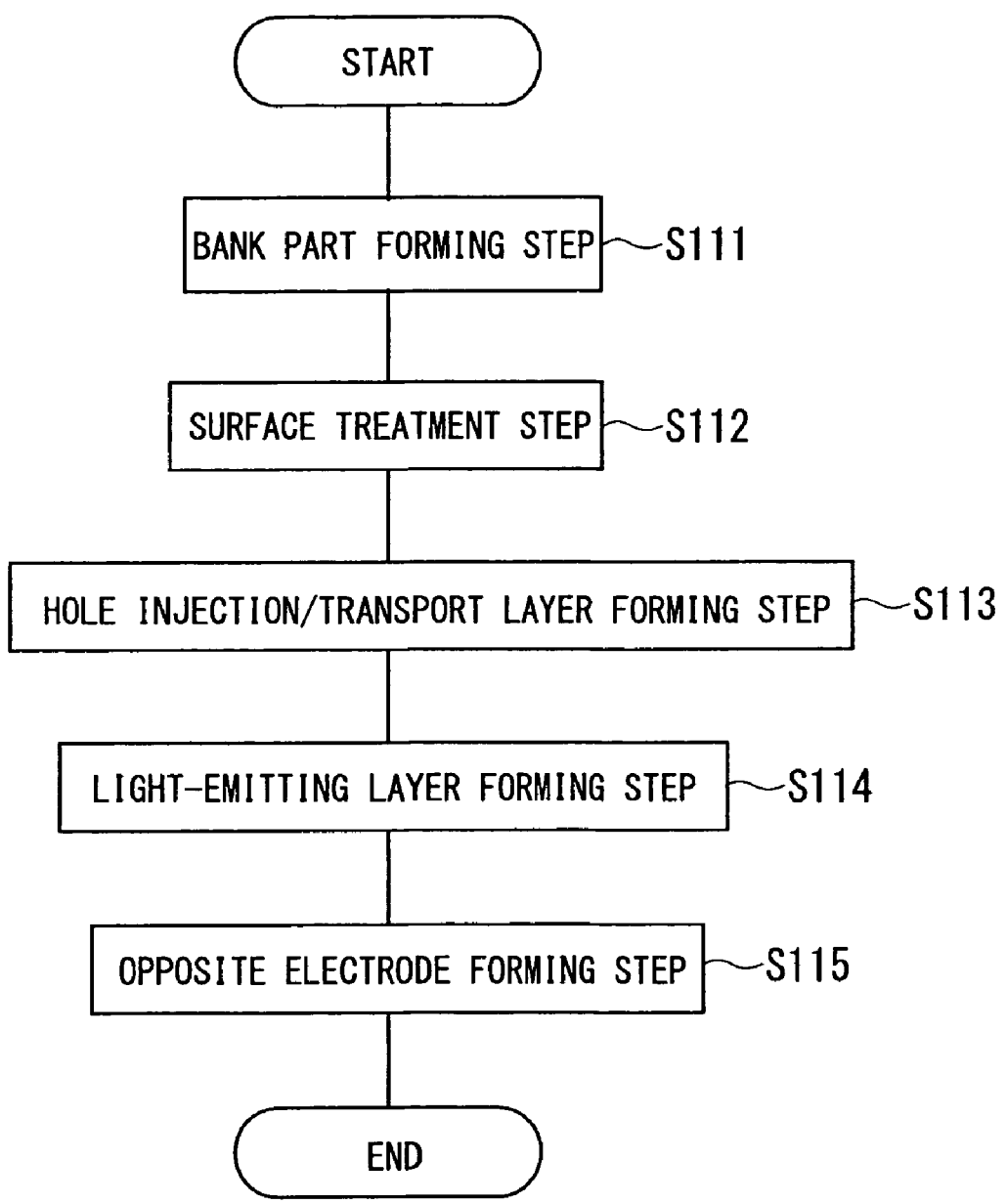
FIG. 12 is a flowchart illustrating manufacturing steps of the display apparatus as the organic EL display apparatus.

As shown in FIG. 12, the display apparatus 600 is manufactured through a bank portion forming step (S111), a surface processing step (S112), a positive-hole injection/transport layer forming step (S113), a light-emitting layer forming step (S114), and a counter electrode forming step (S115). Note that the manufacturing steps are not limited to these examples shown in FIG. 12, and one of these steps may be eliminated or another step may be added as necessary.

Figure 13:
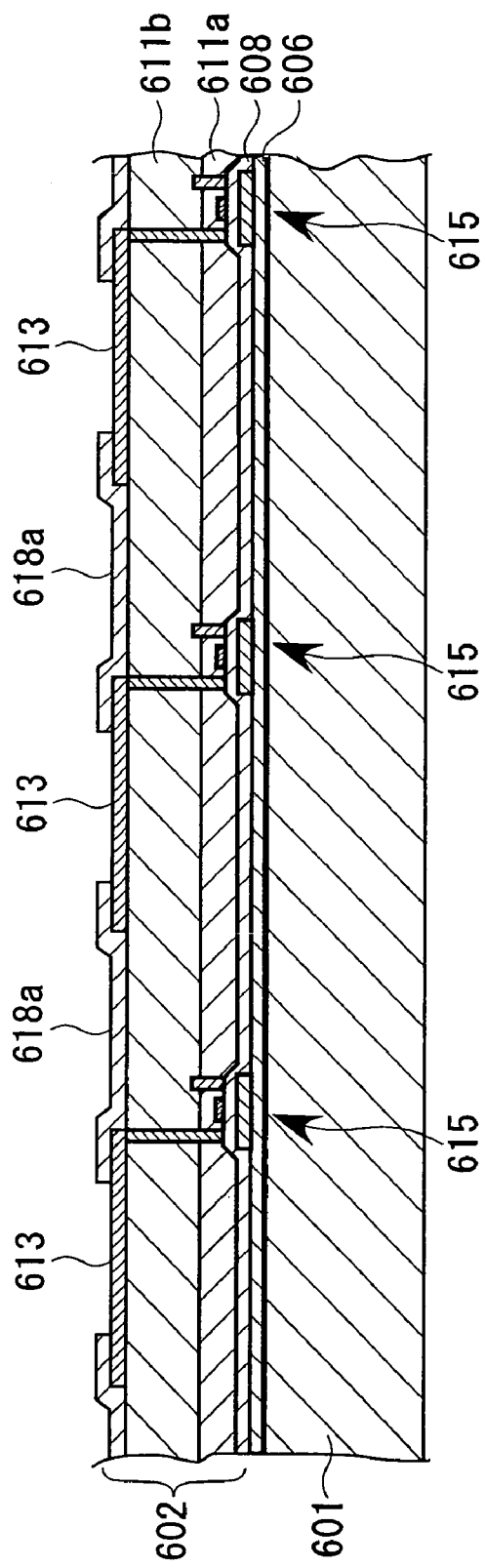
FIG. 13 is a process chart illustrating formation of an inorganic bank layer.

In the bank portion forming step (S111), as shown in FIG. 13, the inorganic bank layers 618a are formed on the second interlayer insulating film 611b. The inorganic bank layers 618a are formed by forming an inorganic film at a desired position and by patterning the inorganic film by the photolithography technique. At this time, a part of each of the inorganic bank layers 618a overlaps peripheries of corresponding two of the pixel electrodes 613 which sandwich each of the inorganic bank layers 618a.

Figure 14:
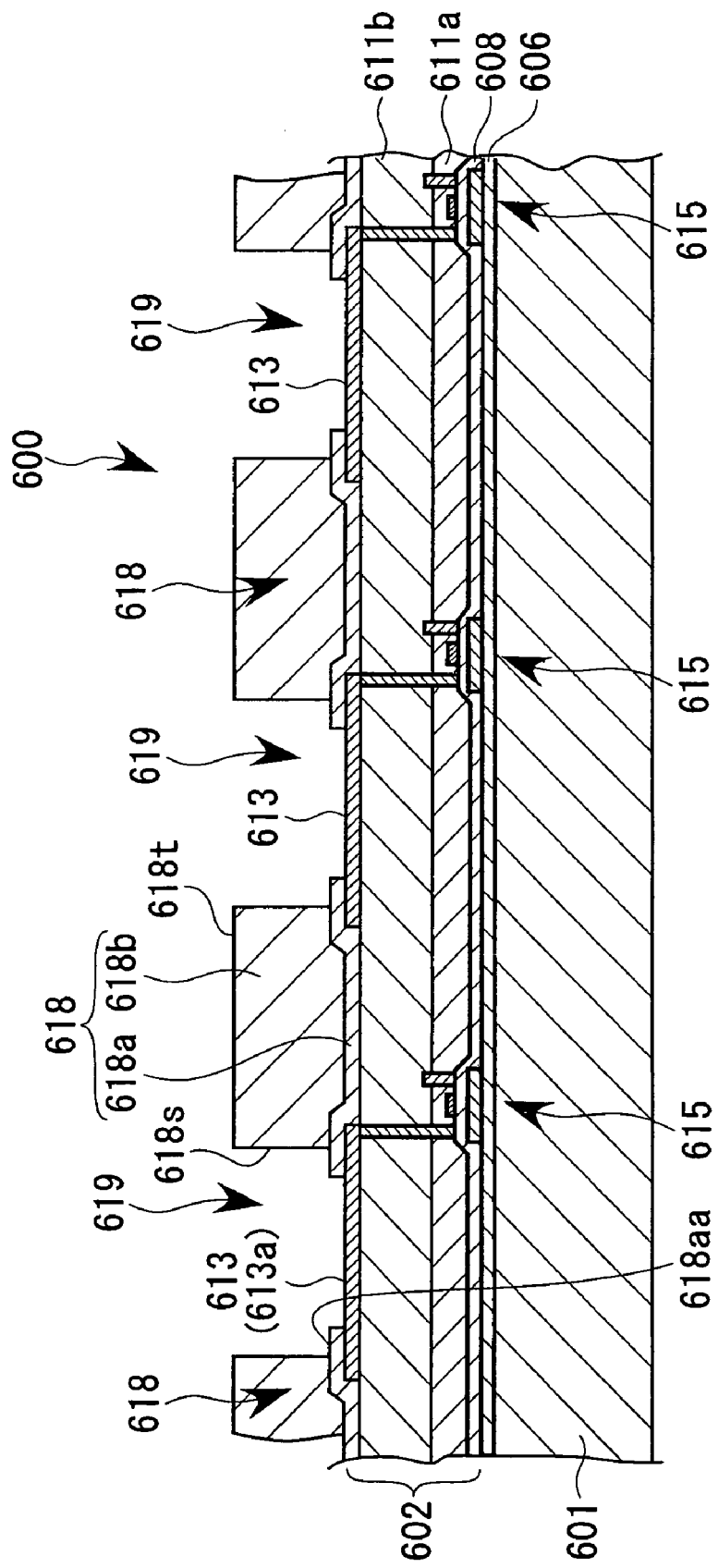
FIG. 14 is a process chart illustrating formation of the organic bank layer.

After the inorganic bank layers 618a are formed, as shown in FIG. 14, the organic bank layers 618b are formed on the inorganic bank layers 618a. As with the inorganic bank layers 618a, the organic bank layers 618b are formed by patterning a formed organic film by the photolithography technique.

The bank portions 618 are thus formed. When the bank portions 618 are formed, the openings 619 opening upward relative to the pixel electrodes 613 are formed between the bank portions 618. The openings 619 define pixel areas.

In the surface processing step (S112), a hydrophilic treatment and a repellency treatment are performed. The hydrophilic treatment is performed on first lamination areas 618aa of the inorganic bank layers 618a and electrode surfaces 613a of the pixel electrodes 613. The hydrophilic treatment is performed, for example, by plasma processing using oxide as a processing gas on surfaces of the first lamination areas 618aa and the electrode surfaces 613a to have hydrophilic properties. By performing the plasma processing, the ITO forming the pixel electrodes 613 is cleaned.

The repellency treatment is performed on walls 618s of the organic bank layers 618b and upper surfaces 618t of the organic bank layers 618b. The repellency treatment is performed as a fluorination treatment, for example, by plasma processing using tetrafluoromethane as a processing gas on the walls 618s of the organic bank layers 618b and the upper surfaces 618t of the organic bank layers 618b.

By performing this surface processing step, when the functional layers 617 are formed using the functional liquid droplet ejection heads 2, the functional liquid droplets are ejected onto the pixel areas with high accuracy. Furthermore, the functional liquid droplets arrived onto the pixel areas are prevented from flowing out of the openings 619.

A display apparatus body 600A is obtained through these steps. The display apparatus body 600A is mounted on the set table of the liquid droplet ejection apparatus and the positive-hole injection/transport layer forming step (S113) and the light-emitting layer forming step (S114) are performed thereon.

Figure 15:
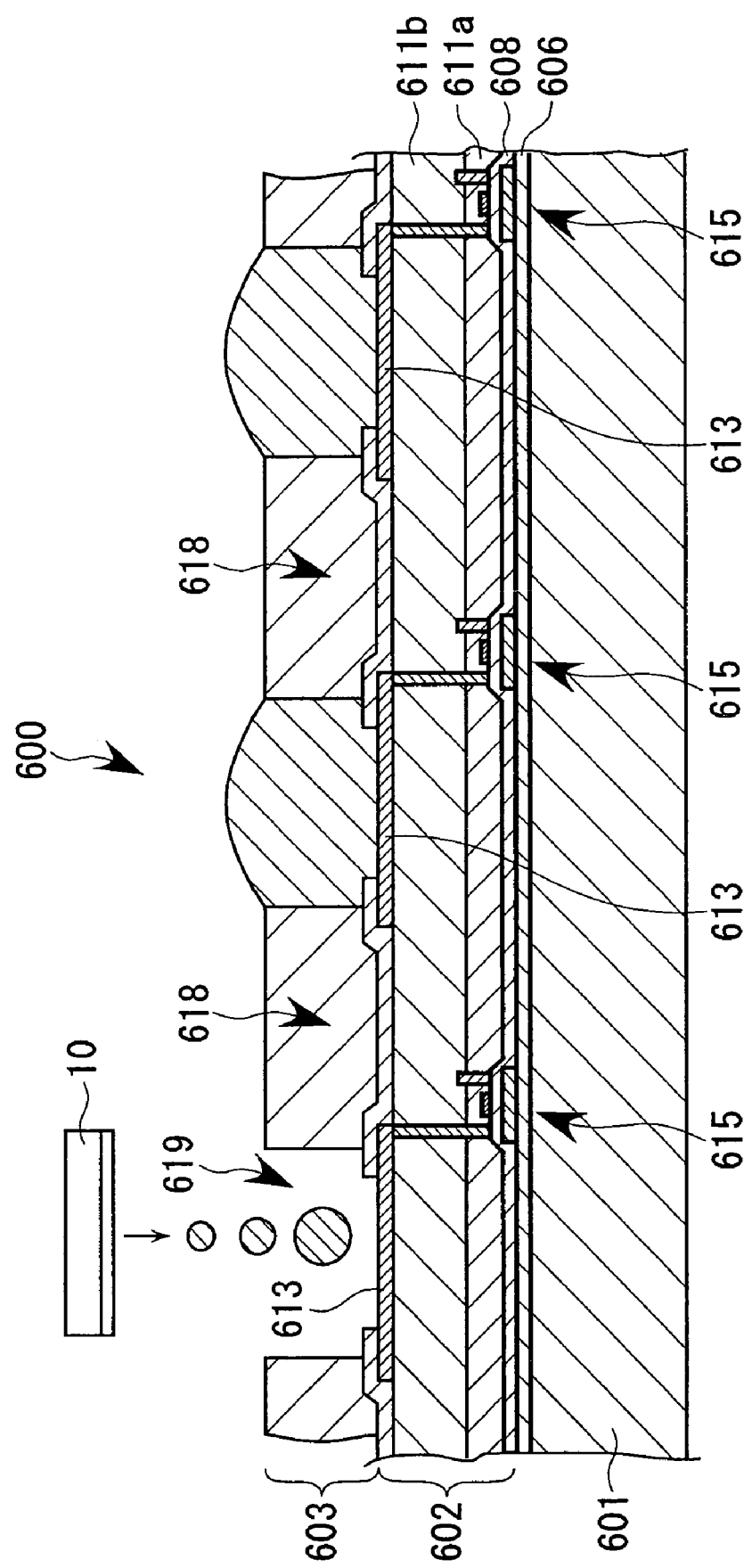
FIG. 15 is a process chart illustrating processes of forming a positive-hole injection/transport layer.
Figure 16:
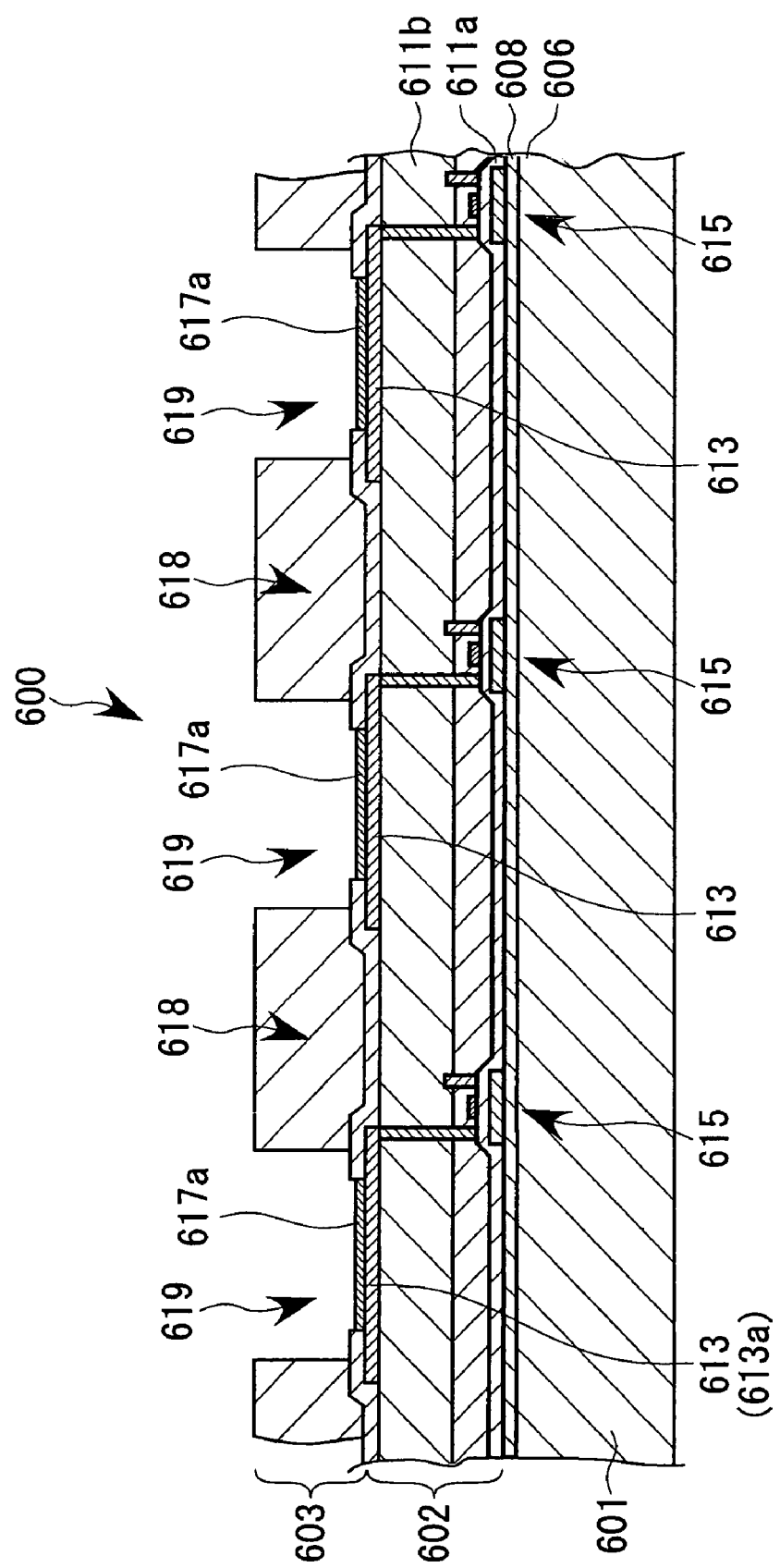
FIG. 16 is a process chart illustrating a state where the positive-hole injection/transport layer has been formed.

As shown in FIG. 15, in the positive-hole injection/transport layer forming step (S113), the first compositions including the material for forming a positive-hole injection/transport layer are ejected from the functional liquid droplet ejection heads 2 into the openings 619 included in the pixel areas. Thereafter, as shown in FIG. 16, drying processing and a thermal treatment are performed to evaporate polar solution included in the first composition whereby the positive-hole injection/transport layers 617a are formed on the pixel electrodes 613 (electrode surface 613a).

The light-emitting layer forming step (S114) will now be described. In the light-emitting layer forming step, as described above, a nonpolar solvent which is insoluble to the positive-hole injection/transport layers 617a is used as the solvent of the second composition used at the time of forming the light-emitting layer in order to prevent the positive-hole injection/transport layers 617a from being dissolved again.

On the other hand, since each of the positive-hole injection/transport layers 617a has low affinity to a nonpolar solvent, even when the second composition including the nonpolar solvent is ejected onto the positive-hole injection/transport layers 617a, the positive-hole injection/transport layers 617a may not be brought into tight contact with the light-emitting layers 617b or the light-emitting layers 617b may not be uniformly applied.

Accordingly, before the light-emitting layers 617b are formed, surface processing (surface improvement processing) is preferably performed so that each of the positive-hole injection/transport layers 617a has high affinity to the nonpolar solvent and to the material for forming the light-emitting layers. The surface processing is performed by applying a solvent the same as or similar to the nonpolar solvent of the second composition used at the time of forming the light-emitting layers on the positive-hole injection/transport layers 617a and by drying the applied solvent.

Employment of this surface processing allows the surface of the positive-hole injection/transport layers 617a to have high affinity to the nonpolar solvent, and therefore, the second composition including the material for forming the light-emitting layers can be uniformly applied to the positive-hole injection/transport layers 617a in the subsequent step.

Figure 17:
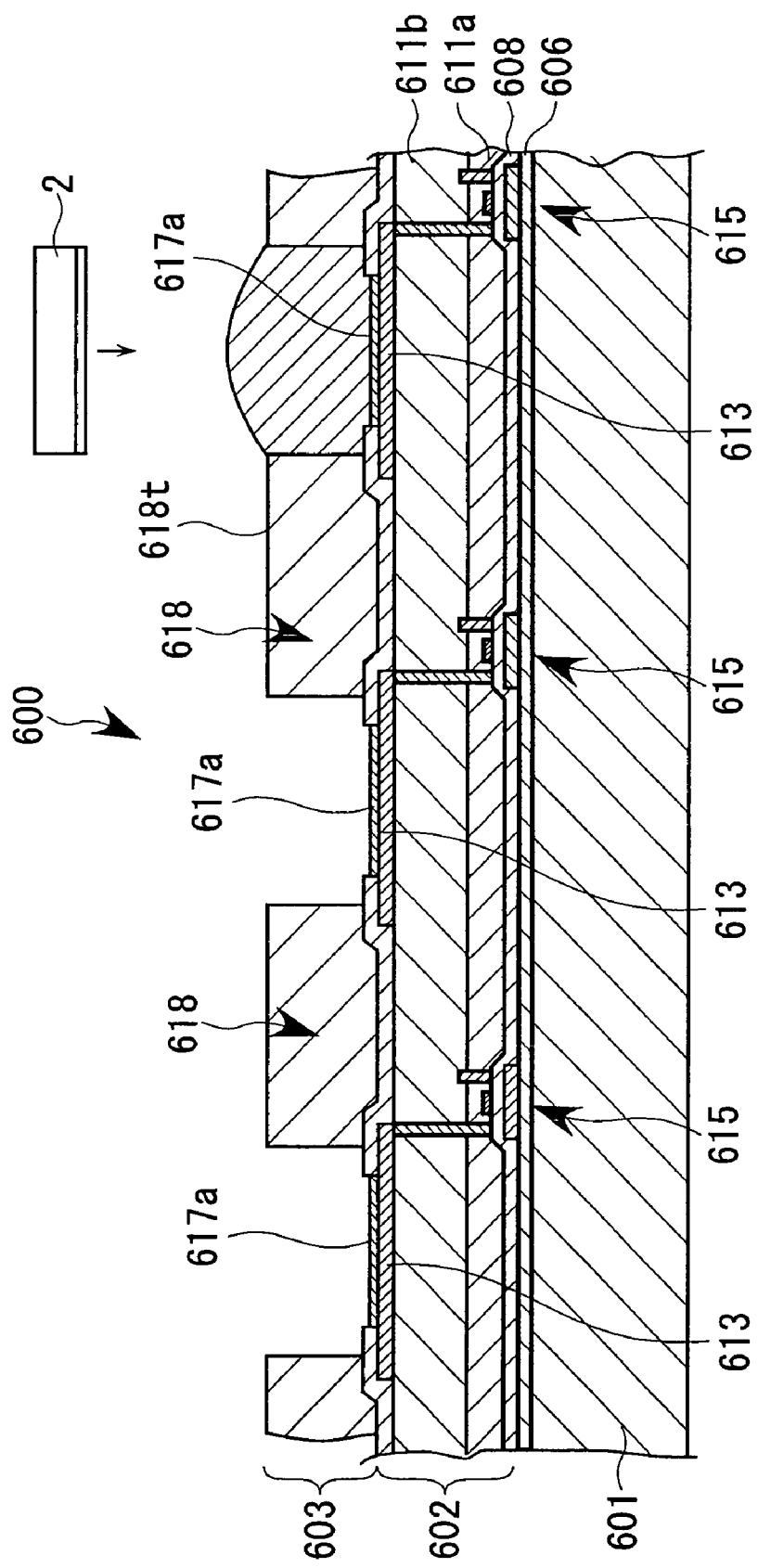
FIG. 17 is a process chart illustrating processes for forming a light-emitting layer having a blue color component.

As shown in FIG. 17, a predetermined amount of second composition including the material for forming the light-emitting layers of one of the three colors (blue color (B) in an example of FIG. 17) is ejected into the pixel areas (openings 619) as functional liquid. The second composition ejected into the pixel areas spreads over the positive-hole injection/transport layer 617a and fills the openings 619. Note that, even if the second composition is ejected and arrived on the upper surfaces 618t of the bank portions 618 which are outside of the pixel area, since the repellency treatment has been performed on the upper surfaces 618t as described above, the second component easily drops into the openings 619.

Figure 18:
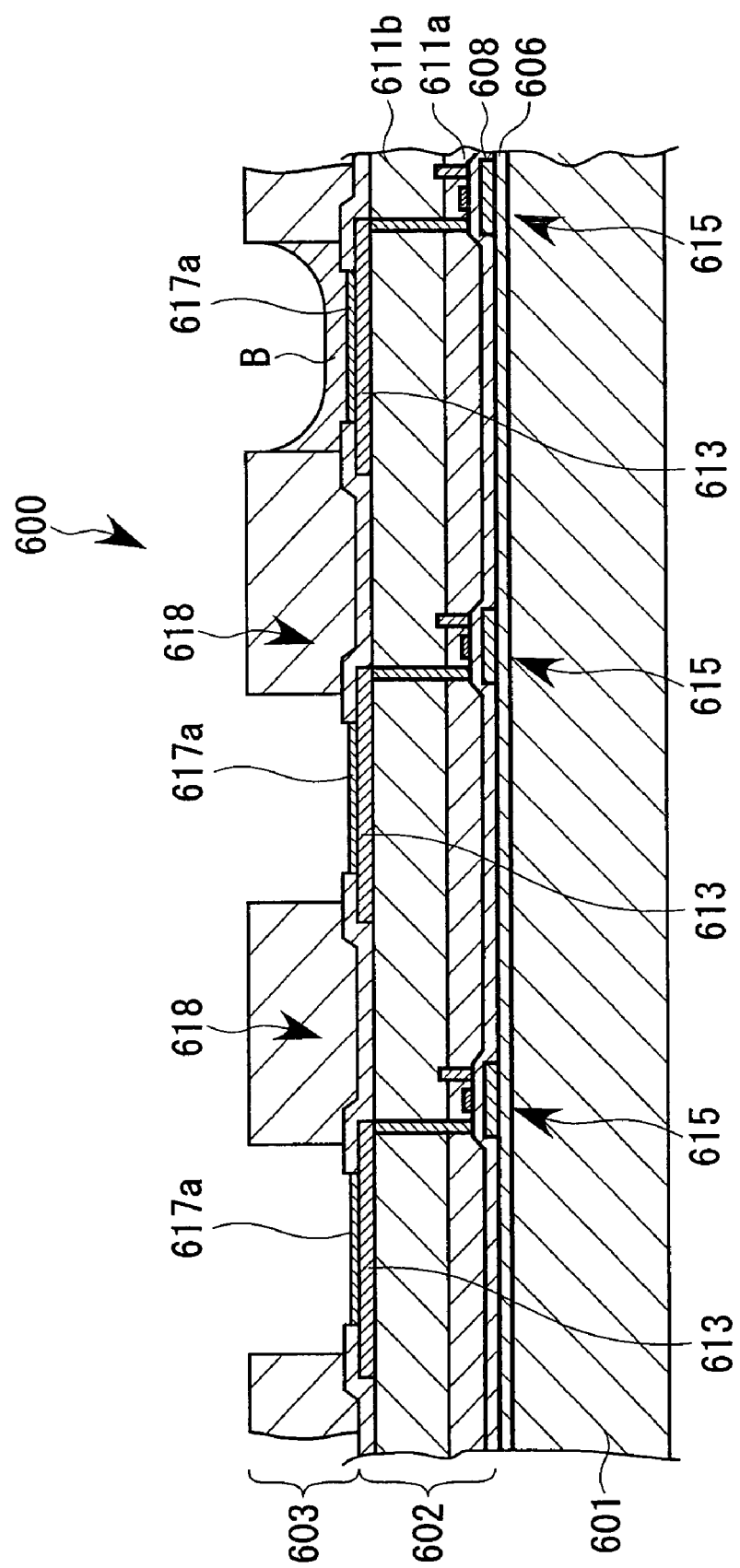
FIG. 18 is a process chart illustrating a state where the light-emitting layer having a blue color component has been formed.

Thereafter, the drying processing is performed so that the ejected second composition is dried and the nonpolar solvent included in the second composition is evaporated whereby the light-emitting layers 617b are formed on the positive-hole injection/transport layers 617a as shown in FIG. 18. In FIG. 18, one of the light-emitting layers 617b corresponding to the blue color (B) is formed.

Figure 19:
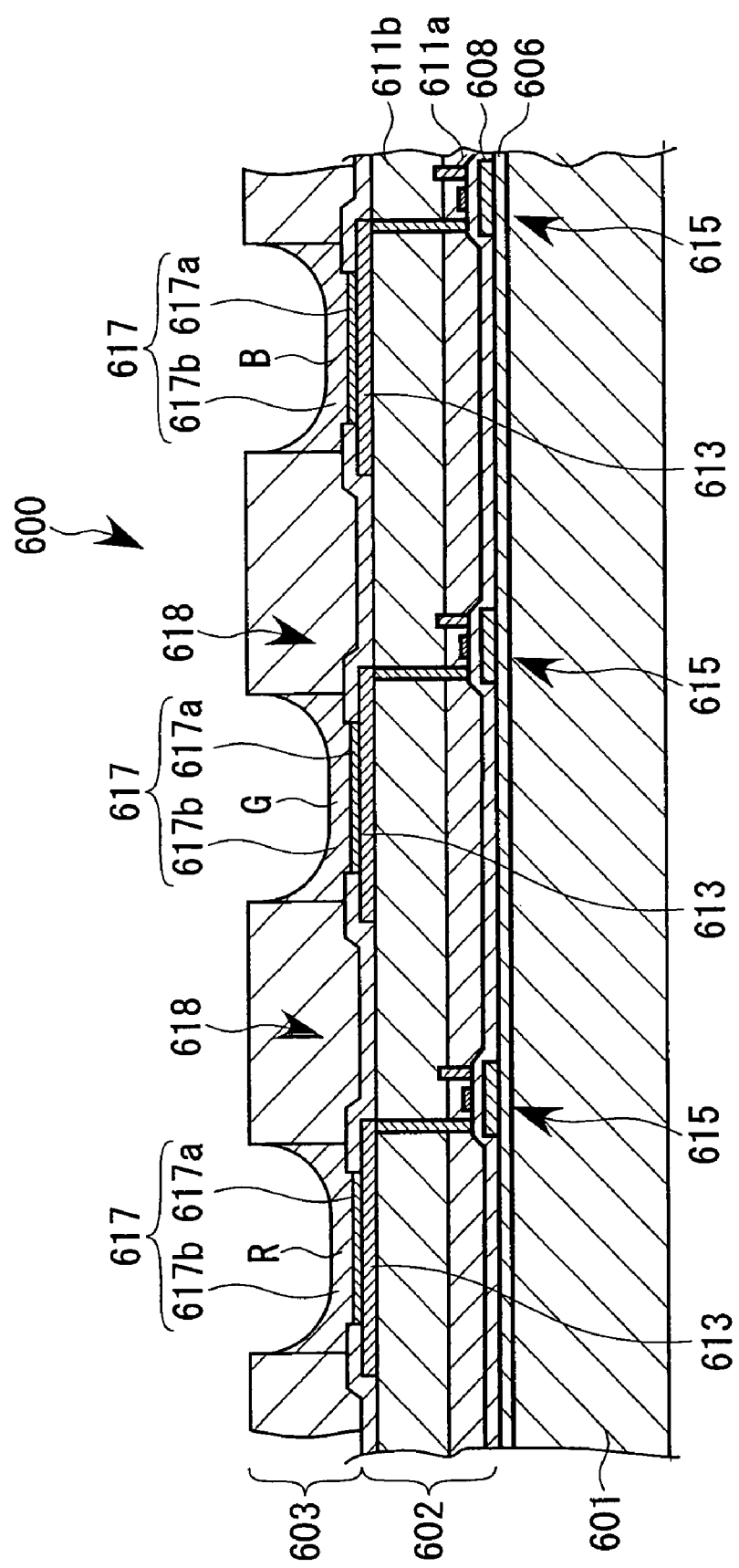
FIG. 19 is a process chart illustrating a state where light-emitting layers having three color components have been formed.

Similarly, as shown in FIG. 19, a step similar to the above-described step of forming the light-emitting layers 617b corresponding to the blue color (B) is repeatedly performed so that the light-emitting layers 617b corresponding to other colors (red (R) and green (G)) are formed. Note that the order of formation of the light-emitting layers 617b is not limited to the order described above as an example, and any other orders may be applicable. For example, an order of forming the light-emitting layers 617b may be determined in accordance with a light-emitting layer forming material. Furthermore, the color scheme pattern of the three colors R, G, and B may be the stripe arrangement, the mosaic arrangement, or the delta arrangement.

As described above, the functional layers 617, that is, the positive-hole injection/transport layers 617a and the light-emitting layers 617b are formed on the pixel electrodes 613. Then, the process proceeds to the counter electrode forming step (S115).

Figure 20:
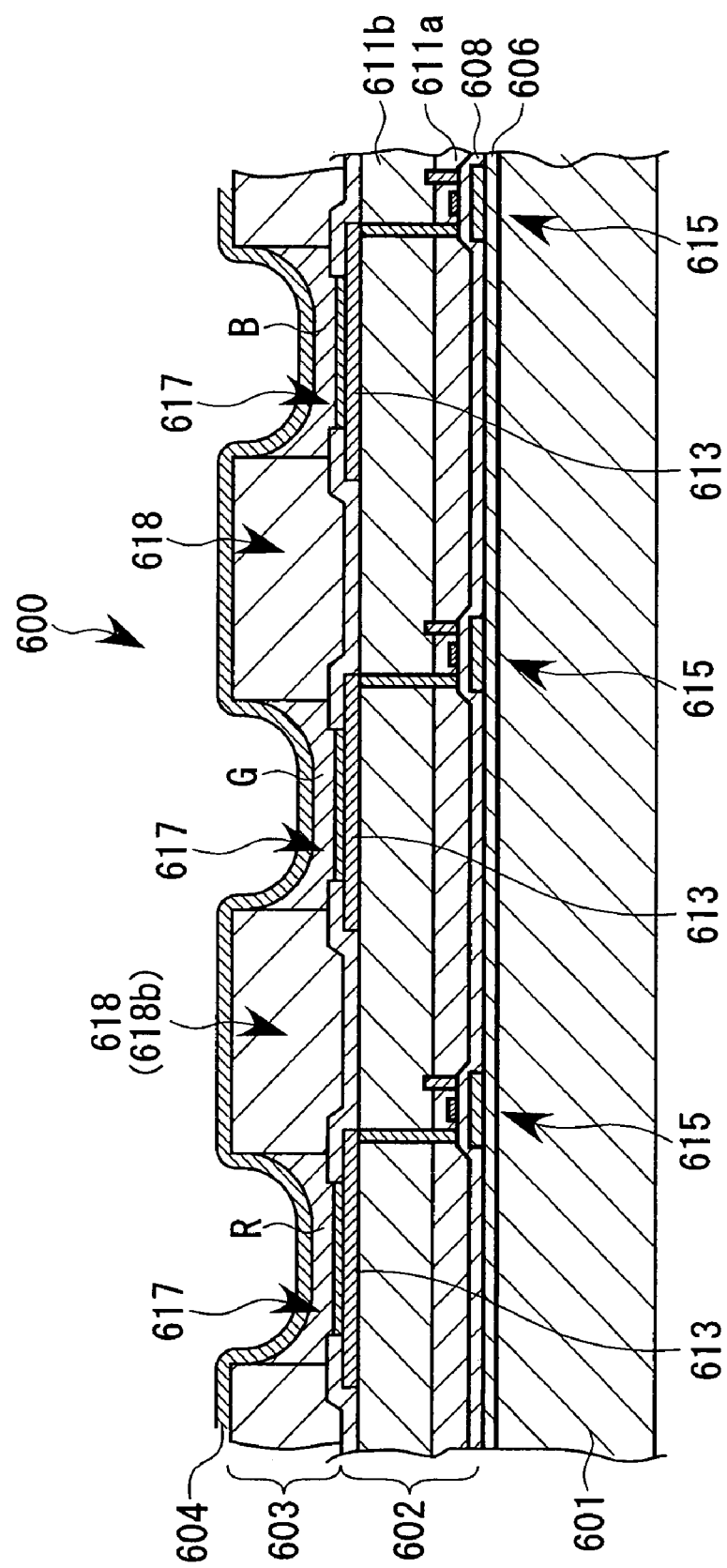
FIG. 20 is a process chart illustrating processes for forming a cathode.

In the counter electrode forming step (S115), as shown in FIG. 20, the cathode (counter electrode) 604 is formed on entire surfaces of the light-emitting layers 617b and the organic bank layers 618b by an evaporation method, sputtering, or a CVD (chemical vapor deposition) method, for example. The cathode 604 is formed by laminating a calcium layer and an aluminum layer, for example, in this embodiment.

An Al film and an Ag film as electrodes and a protective layer formed of $SiO_2$ or SiN for preventing the Al film and the Ag film from being oxidized are formed on the cathode 604.

After the cathode 604 is thus formed, other processes such as sealing processing of sealing a top surface of the cathode 604 with a sealing member and wiring processing are performed whereby the display apparatus 600 is obtained.

Figure 21:
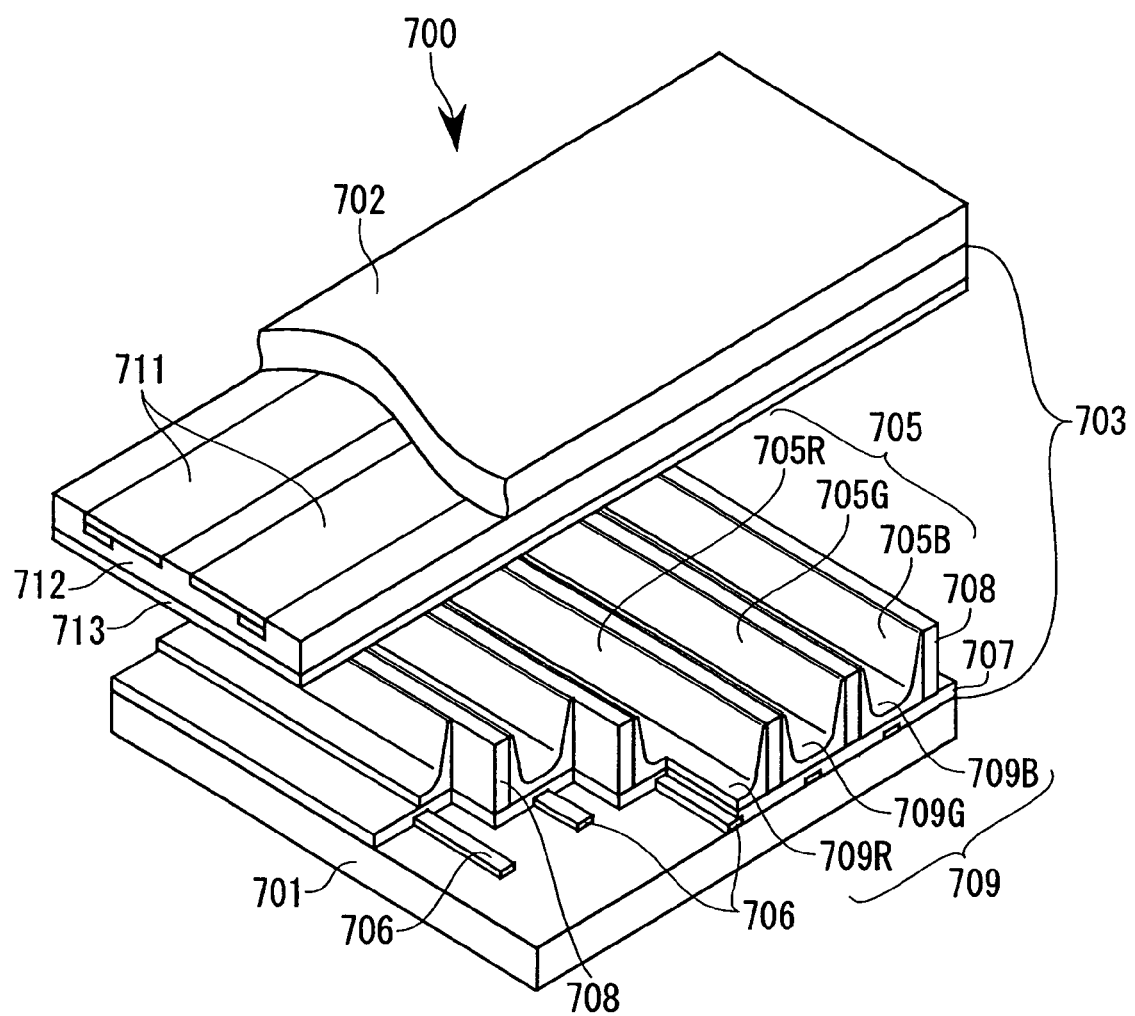
FIG. 21 is a perspective view illustrating an essential part of a plasma display apparatus (PDP apparatus).

FIG. 21 is an exploded perspective view of an essential part of a plasma display apparatus (PDP apparatus: hereinafter simply referred to as a display apparatus 700). Note that, in FIG. 21, the display apparatus 700 is partly cut away.

The display apparatus 700 includes a first substrate 701, a second substrate 702 which faces the first substrate 701, and a discharge display portion 703 interposed therebetween. The discharge display portion 703 includes a plurality of discharge chambers 705. The discharge chambers 705 include red discharge chambers 705R, green discharge chambers 705G, and blue discharge chambers 705B, and are arranged so that one of the red discharge chambers 705R, one of the green discharge chambers 705G, and one of the blue discharge chambers 705B constitute one pixel as a group.

Address electrodes 706 are arranged on the first substrate 701 with predetermined intervals therebetween in a stripe pattern, and a dielectric layer 707 is formed so as to cover top surfaces of the address electrodes 706 and the first substrate 701. Partition walls 708 are arranged on the dielectric layer 707 so as to be arranged along with the address electrodes 706 in a standing manner between the adjacent address electrodes 706. Some of the partition walls 708 extend in a width direction of the address electrodes 706 as shown in FIG. 21, and the others (not shown) extend perpendicular to the address electrodes 706.

Regions partitioned by the partition walls 708 serve as the discharge chambers 705.

The discharge chambers 705 include respective fluorescent substances 709. Each of the fluorescent substances 709 emits light having one of the colors of red (R), green (G) and blue (B). The red discharge chamber 705R has a red fluorescent substance 709R on its bottom surface, the green discharge chamber 705G has a green fluorescent substance 709G on its bottom surface, and the blue discharge chamber 705B has a blue fluorescent substance 709B on its bottom surface.

A plurality of display electrodes 711 are formed with predetermined intervals therebetween in a stripe manner in a direction perpendicular to the address electrodes 706. A dielectric layer 712 and a protective film 713 formed of MgO, for example, are formed so as to cover the display electrodes 711.

The first substrate 701 and the second substrate 702 are attached so that the address electrodes 706 are arranged perpendicular to the display electrodes 711. Note that the address electrodes 706 and the display electrodes 711 are connected to an alternate power source (not shown).

When the address electrodes 706 and the display electrodes 711 are brought into conduction states, the fluorescent substances 709 are excited and emit light whereby display with colors is achieved.

In this embodiment, the address electrodes 706, the display electrodes 711, and the fluorescent substances 709 may be formed using the liquid droplet ejection apparatus. Steps of forming the address electrodes 706 on the first substrate 701 are described hereinafter.

The steps are performed in a state where the first substrate 701 is mounted on the set table on the liquid droplet ejection apparatus.

The functional liquid droplet ejection heads 2 eject a liquid material (functional liquid) including a material for forming a conducting film wiring as functional droplets to be arrived onto regions for forming the address electrodes 706. The material for forming a conducting film wiring included in the liquid material is formed by dispersing conductive fine particles such as those of a metal into dispersed media. Examples of the conductive fine particles include a metal fine particle including gold, silver, copper, palladium, or nickel, and a conductive polymer.

When ejection of the liquid material onto all the desired regions for forming the address electrodes 706 is completed, the ejected liquid material is dried, and the disperse media included in the liquid material is evaporated whereby the address electrodes 706 are formed.

Although the steps of forming the address electrodes 706 are described as an example above, the display electrodes 711 and the fluorescent substances 709 may be formed by the steps described above.

In a case where the display electrodes 711 are formed, as with the address electrodes 706, a liquid material (functional liquid) including a material for forming a conducting film wiring is ejected from the functional liquid droplet ejection heads 17 as liquid droplets to be arrived on the areas for forming the display electrodes.

In a case where the fluorescent substances 709 are formed, a liquid material including fluorescent materials corresponding to three colors (R, G, and B) is ejected as liquid droplets from the functional liquid droplet ejection heads 17 so that liquid droplets having the three colors (R, G, and B) are arrived within the discharge chambers 705.

FIG. 22 shows a sectional view of an essential part of an electron emission apparatus (also referred to as a FED apparatus or a SED apparatus: hereinafter simply referred to as a display apparatus 800). In FIG. 22, a part of the display apparatus 800 is shown in the sectional view.

The display apparatus 800 includes a first substrate 801, a second substrate 802 which faces the first substrate 801, and a field-emission display portion 803 interposed therebetween. The field-emission display portion 803 includes a plurality of electron emission portions 805 arranged in a matrix.

First element electrodes 806a and second element electrodes 806b, and conductive films 807 are arranged on the first substrate 801. The first element electrodes 806a and the second element electrodes 806b intersect with each other. Cathode electrodes 806 are formed on the first substrate 801, and each of the cathode electrodes 806 is constituted by one of the first element electrodes 806a and one of the second element electrodes 806b. In each of the cathode electrodes 806, one of the conductive films 807 having a gap 808 is formed in a portion formed by the first element electrode 806a and the second element electrode 806b. That is, the first element electrodes 806a, the second element electrodes 806b, and the conductive films 807 constitute the plurality of electron emission portions 805. Each of the conductive films 807 is constituted by palladium oxide (PdO). In each of the cathode electrodes 806, the gap 808 is formed by forming processing after the corresponding one of the conductive films 807 is formed.

An anode electrode 809 is formed on a lower surface of the second substrate 802 so as to face the cathode electrodes 806. A bank portion 811 is formed on a lower surface of the anode electrode 809 in a lattice. Fluorescent materials 813 are arranged in opening portions 812 which opens downward and which are surrounded by the bank portion 811. The fluorescent materials 813 correspond to the electron emission portions 805. Each of the fluorescent materials 813 emits fluorescent light having one of the three colors, red (R), green (G), and blue (B). Red fluorescent materials 813R, green fluorescent materials 813G, and blue fluorescent materials 813B are arranged in the opening portions 812 in a predetermined arrangement pattern described above.

The first substrate 801 and the second substrate 802 thus configured are attached with each other with a small gap therebetween. In this display apparatus 800, electrons emitted from the first element electrodes 806a or the second element electrodes 806b included in the cathode electrodes 806 hit the fluorescent materials 813 formed on the anode electrode 809 through the conductive films 807 (the gap 808) so that the fluorescent materials 813 are excited and emit light whereby display with colors is achieved.

As with the other embodiments, in this case also, the first element electrodes 806a, the second element electrodes 806b, the conductive films 807, and the anode electrode 809 may be formed using the liquid droplet ejection apparatus. In addition, the red fluorescent materials 813R, the green fluorescent materials 813G, and the blue fluorescent materials 813B may be formed using the liquid droplet ejection apparatus.

Figure 23A:
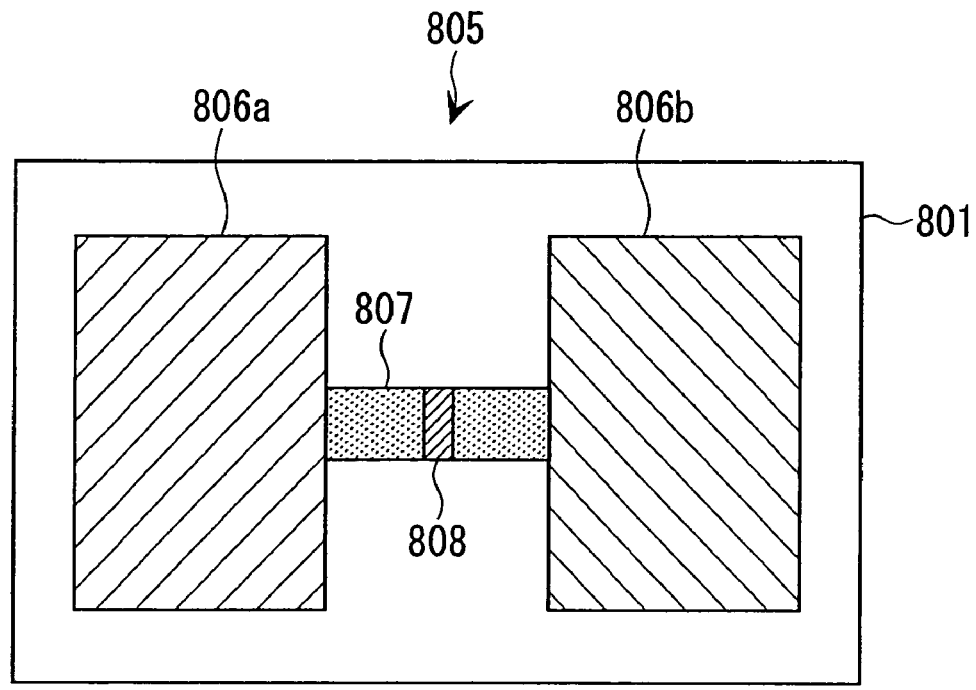
FIG. 23A is a plan view illustrating an electron emission portion and the vicinity thereof of a display apparatus.
Figure 23B:
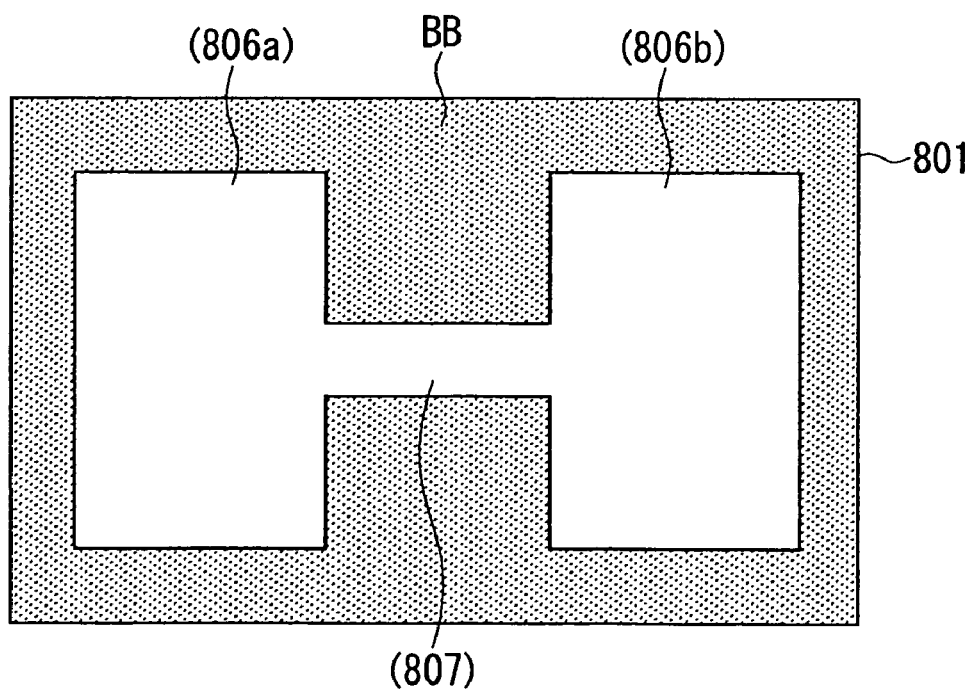
FIG. 23B is a plan view illustrating a method of forming the electron emission portion and the vicinity thereof.

Each of the first element electrodes 806a, each of the second element electrodes 806b, and each of the conductive films 807 have shapes as shown in FIG. 23A. When the first element electrodes 806a, the second element electrodes 806b, and the conductive films 807 are formed, portions for forming the first element electrodes 806a, the second element electrodes 806b, and the conductive films 807 are left as they are on the first substrate 801 and only bank portions BB are formed (by a photolithography method) as shown in FIG. 23B. Then, the first element electrodes 806a and the second element electrodes 806b are formed by an inkjet method using a solvent ejected from the liquid droplet ejection apparatus in grooves defined by the bank portions BB and are formed by drying the solvent. Thereafter, the conductive films 807 are formed by the inkjet method using the liquid droplet ejection apparatus. After forming the conductive films 807, the bank portions BB are removed by ashing processing and the forming processing is performed. Note that, as with the case of the organic EL device, the hydrophilic treatment is preferably performed on the first substrate 801 and the second substrate 802 and the repellency treatment is preferably performed on the bank portion 811 and the bank portions BB.

Examples of other electro-optical apparatuses include an apparatus for forming metal wiring, an apparatus for forming a lens, an apparatus for forming a resist, and an apparatus for forming an optical diffusion body. Use of the liquid droplet ejection apparatus makes it possible to efficiently manufacture various electro-optical apparatuses.

What is claimed is:

1. A method of measuring topology of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured by a surface topology measuring apparatus having an interferometer comprising:

measuring surface topologies in which surface topology of the functional liquid in the pixel and surface topology of the bank are measured by the surface topology measuring apparatus, and measurement parameters regarding the surface topologies are generated;

adding a bank height in which a height parameter corresponding to a height of the bank is added to the measurement parameter of a surface of the functional liquid in the pixel of the measurement parameter generated; and calculating topology in which at least one of thickness and volume of the functional liquid in the pixel is calculated based on the added measurement parameter of the surface of the functional liquid in the pixel and the measurement parameter of the surface of the bank.

2. A method of measuring topology of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in a pixel arrived in the pixel region is measured by a surface topology measuring apparatus having an interferometer comprising:

measuring surface topologies in which surface topology of the functional liquid in the pixel and surface topology of the bank are measured by the surface topology measuring apparatus, and measurement parameters regarding the surface topologies are generated;

subtracting a bank height in which a height parameter corresponding to a height of the bank is subtracted from a measurement parameter of a surface of the functional liquid in the pixel of the measurement parameter generated; and calculating topology in which at least one of thickness and volume of the functional liquid in the pixel is calculated based on the subtracted measurement parameter of the surface of the bank and the measurement parameter of the surface of the functional liquid in the pixel.

3. The method of measuring topology of functional liquid in the pixel according to claim 1, wherein a measured point on the surface of the bank is surface treated with a light reflectivity material.

4. A topology measuring apparatus of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured comprising:

a surface topology measuring device which measures surface topology of the functional liquid in the pixel and surface topology of the bank;

a measurement parameter generating device which generates measurement parameters regarding the surface topologies based on a measurement result by the surface topology measuring device;

a bank height adding device which adds a height parameter corresponding to a height of the bank to a measurement parameter of a surface of the functional liquid in the pixel of the measurement parameter generated; and a topology calculating device which calculates at least one of thickness and volume of the functional liquid in the pixel based on the added measurement parameter of the surface of the functional liquid in the pixel and the measurement parameter of the surface of the bank.

5. A topology measuring apparatus of functional liquid in a pixel, in which functional liquid droplet is ejected from a functional liquid droplet ejection head on a substrate having a bank defining a pixel region to cause the functional liquid droplet to arrive in the pixel region, and at least one of thickness and volume of the functional liquid in the pixel arrived in the pixel region is measured comprising:

a surface topology measuring device which measures surface topology of the functional liquid in the pixel and surface topology of the bank;

a measurement parameter generating device which generates measurement parameters regarding the surface topologies based on a measurement result by the surface topology measuring device;

a bank height subtracting device which subtracts a height parameter corresponding to a height of the bank from measurement parameter of a surface of the functional liquid in the pixel of the measurement parameter generated; and a topology calculating device which calculates at least one of thickness and volume of the functional liquid in the pixel based on the subtracted measurement parameter of the surface of the bank and the measurement parameter of the surface of the functional liquid in the pixel.

6. A liquid droplet ejection apparatus comprising:

the topology measuring apparatus of the functional liquid in the pixel according to claim 4;

a head unit having a sub carriage on which a plurality of functional liquid droplet ejection heads is mounted; and a drawing device which draws by ejecting a functional liquid droplet from the plurality of functional liquid droplet ejection heads with a relative movement of the head unit to the substrate.

7. The liquid droplet ejection apparatus according to claim 6, wherein the head unit comprises a functional liquid droplet ejection head ejecting functional liquid of red color, a functional liquid droplet ejection head ejecting functional liquid of green color, and a functional liquid droplet ejection head ejecting functional liquid of blue color.

8. A method of manufacturing an electro-optical apparatus wherein a film portion is formed with a functional liquid droplet on the substrate using the liquid droplet ejection apparatus according to claim 6.

9. An electro-optical apparatus wherein a film portion is formed with a functional liquid droplet on the substrate using the liquid droplet ejection apparatus according to claim 6.

10. An electronic apparatus comprising an electro-optical apparatus manufactured by the method of the electro-optical apparatus according to claim 8.

11. An electronic apparatus comprising an electro-optical apparatus according to claim 9.

* * * * *